United States Patent
Dekel et al.

(10) Patent No.: US 12,430,709 B1
(45) Date of Patent: Sep. 30, 2025

(54) AUTOMATED DISPLAY ZOOM BASED ON MOVEMENT OF USER

(71) Applicant: Microsoft Technology Licensing, LLC, Redmond, WA (US)

(72) Inventors: Shoham Dekel, Tel Aviv (IL); Gilad Pundak, Rehovot (IL); Uri Ron, Kfar Saba (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/664,961

(22) Filed: May 15, 2024

(51) Int. Cl.
*G06T 3/40* (2024.01)
*G06F 3/01* (2006.01)
*G09G 5/00* (2006.01)

(52) U.S. Cl.
CPC ............... *G06T 3/40* (2013.01); *G06F 3/011* (2013.01); *G09G 5/006* (2013.01); *G09G 2320/0693* (2013.01); *G09G 2340/045* (2013.01); *G09G 2354/00* (2013.01)

(58) Field of Classification Search
CPC .......... G06T 3/40; G06F 3/011; G09G 5/006; G09G 2320/0693; G09G 2340/045; G09G 2354/00
See application file for complete search history.

(56) References Cited

U.S. PATENT DOCUMENTS

| | | |
|---|---|---|
| 8,468,469 B1 * | 6/2013 | Mendis ............... G06F 3/04883 715/788 |
| 11,402,640 B1 | 8/2022 | Singamsetty |
| 11,509,816 B2 | 11/2022 | Ebata |
| 2007/0279591 A1 | 12/2007 | Wezowski et al. |
| 2009/0141147 A1 | 6/2009 | Alberts et al. |
| 2010/0188426 A1 | 7/2010 | Ohmori et al. |
| 2010/0189426 A1 | 7/2010 | Bao |
| 2011/0261081 A1 | 10/2011 | Weinblatt |
| 2012/0038675 A1 | 2/2012 | Johnson |

(Continued)

FOREIGN PATENT DOCUMENTS

| | | |
|---|---|---|
| CN | 107566639 A | 1/2018 |
| WO | 2021022840 A1 | 1/2021 |

OTHER PUBLICATIONS

Extended European search report received for European Application No. 25176646.5, mailed on Jul. 8, 2025, 11 pages.

*Primary Examiner* — Dmitriy Bolotin
(74) *Attorney, Agent, or Firm* — Weaver IP L.L.C.

(57) ABSTRACT

Display zoom setting adjustment systems are disclosed herein. In an example system, content is displayed on a display device according to a first zoom profile. The first zoom profile identifies different zoom values for different lean angles, where the lean angles are based on a position of a user of a computing device in a direction parallel to the display device. Zoom behaviors of the user are observed over a period of time, where the zoom behaviors are based on detecting a set of user movements. The first zoom profile is calibrated based on the observed zoom behaviors to generate a second profile. Using the second zoom profile, content is displayed on the display device and zoomed according to the parameters of the zoom profile. In this manner, zooming behaviors specific to a user based on their physical movements can be tailored, resulting in an improved user interface experience.

20 Claims, 7 Drawing Sheets

(56) References Cited

U.S. PATENT DOCUMENTS

| | | |
|---|---|---|
| 2013/0044135 A1 | 2/2013 | Lee |
| 2013/0249948 A1* | 9/2013 | Reitan ................ G06T 19/00 |
| | | 345/633 |
| 2014/0057675 A1 | 2/2014 | Meyers |
| 2015/0009238 A1 | 1/2015 | Kudalkar |
| 2015/0135108 A1* | 5/2015 | Pope ................ G06F 1/1671 |
| | | 715/767 |
| 2015/0149956 A1 | 5/2015 | Kempinski |
| 2015/0341626 A1 | 11/2015 | Kim |
| 2016/0349970 A1 | 12/2016 | Everitt |
| 2017/0344108 A1 | 11/2017 | Mosqueda Mejia |
| 2018/0070019 A1* | 3/2018 | Laurent ............... H04N 23/63 |
| 2019/0122440 A1* | 4/2019 | Barros ................ G06T 7/75 |
| 2019/0138086 A1 | 5/2019 | Huang |
| 2019/0139281 A1* | 5/2019 | Chapman ............ H04N 23/20 |
| 2019/0324530 A1* | 10/2019 | Stellmach ........... G06F 3/017 |
| 2020/0371733 A1* | 11/2020 | Rao .................. G06F 3/0481 |
| 2022/0121277 A1 | 4/2022 | Azam |
| 2023/0082451 A1 | 3/2023 | Chen |
| 2023/0115144 A1* | 4/2023 | Kao ................... H04N 23/57 |
| | | 348/369 |
| 2023/0353861 A1* | 11/2023 | Nordquist .......... H04N 23/695 |
| 2024/0112408 A1* | 4/2024 | Berliner ............ A63F 13/577 |
| 2024/0273793 A1* | 8/2024 | DeCharms ............ G09B 5/06 |
| 2025/0044883 A1* | 2/2025 | Lu .................. G06F 3/03545 |

\* cited by examiner

```
┌─────────────────────────────────────────────────────────────────┐
│ Detecting a set of user movements that comprise a first        │
│ movement of a user in a first direction parallel to a display  │─ 602
│ device and a second movement of the user in a second           │
│ direction perpendicular to the display device.                 │
└─────────────────────────────────────────────────────────────────┘
600

FIG. 6
```

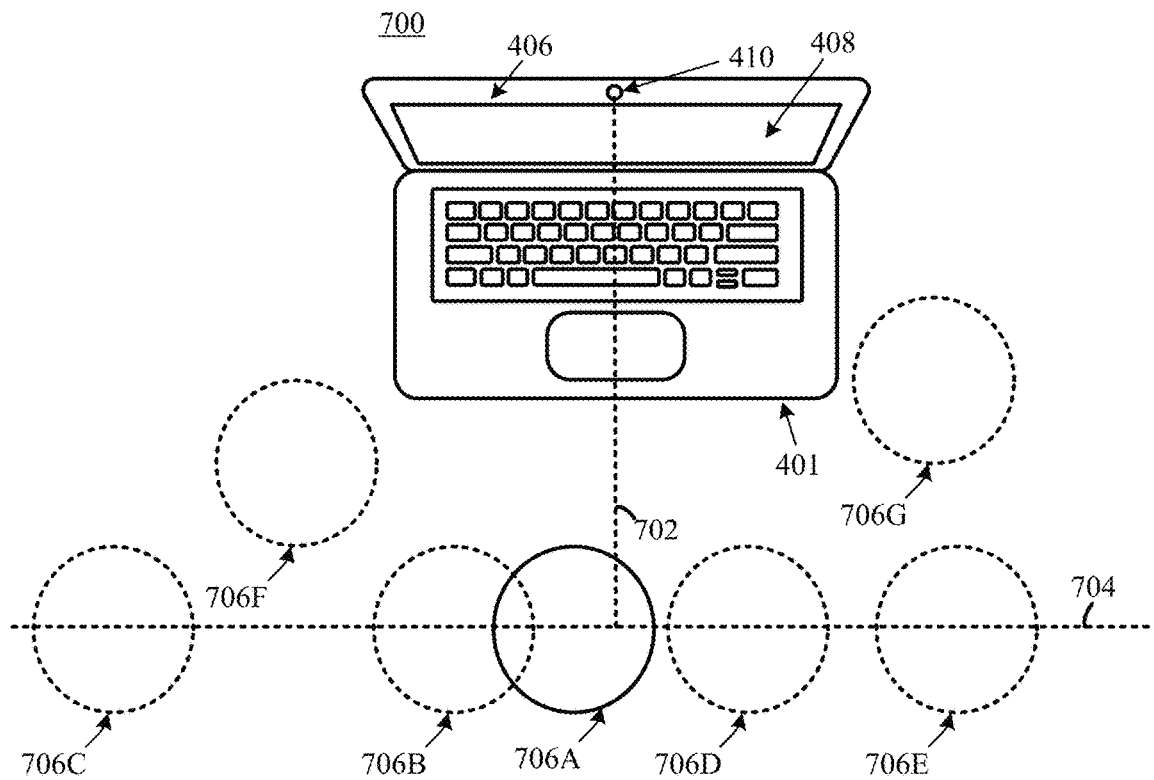

FIG. 7

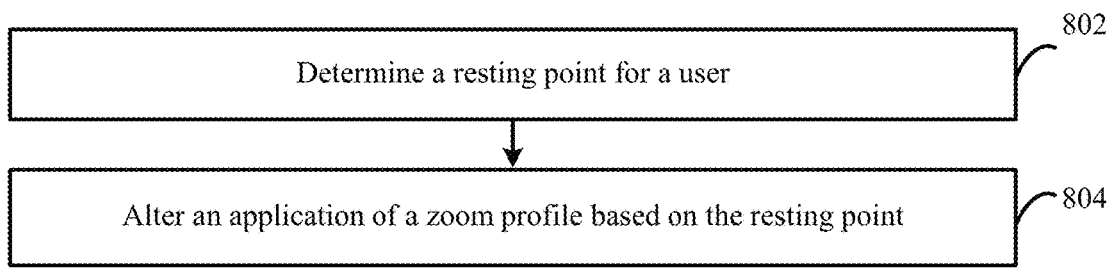

FIG. 8

AUTOMATED DISPLAY ZOOM BASED ON MOVEMENT OF USER

BACKGROUND

Various improvements to display devices coupled to computers have occurred over time, such as increasing the screen size and resolution. Despite these improvements, computing device users often still have to alter the manner in which content is rendered on a display to improve their ability to view such content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods are disclosed herein for adjusting a display zoom setting. In an example system, content is displayed on a display device according to a first zoom profile, such as an initial zoom profile. The initial zoom profile identifies different zoom values for different lean angles, where the lean angles are based on a position of a user of a computing device in a direction parallel to the display device (e.g., a side to side movement). Zoom behaviors of the user are observed over a period of time, where the zoom behaviors are based on detecting a set of user movements. The initial zoom profile is calibrated based on the observed zoom behaviors to generate a zoom profile for the user. Using the zoom profile for the user, content is displayed on the display device and zoomed according to the parameters of the zoom profile. In this manner, zooming behaviors specific to a user based on their physical movements can be tailored, resulting in an improved user interface experience (e.g., by improving ability to view and/or interact with content).

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 6 shows a flowchart of a method for detecting a set of movements in a plurality of directions, in accordance with an example embodiment.

FIG. 7 illustrates various additional user movements that are detected by a computing device, in accordance with example embodiments.

FIG. 8 shows a flowchart of a method for determining a user resting point, in accordance with an example embodiment.

Figure 1:
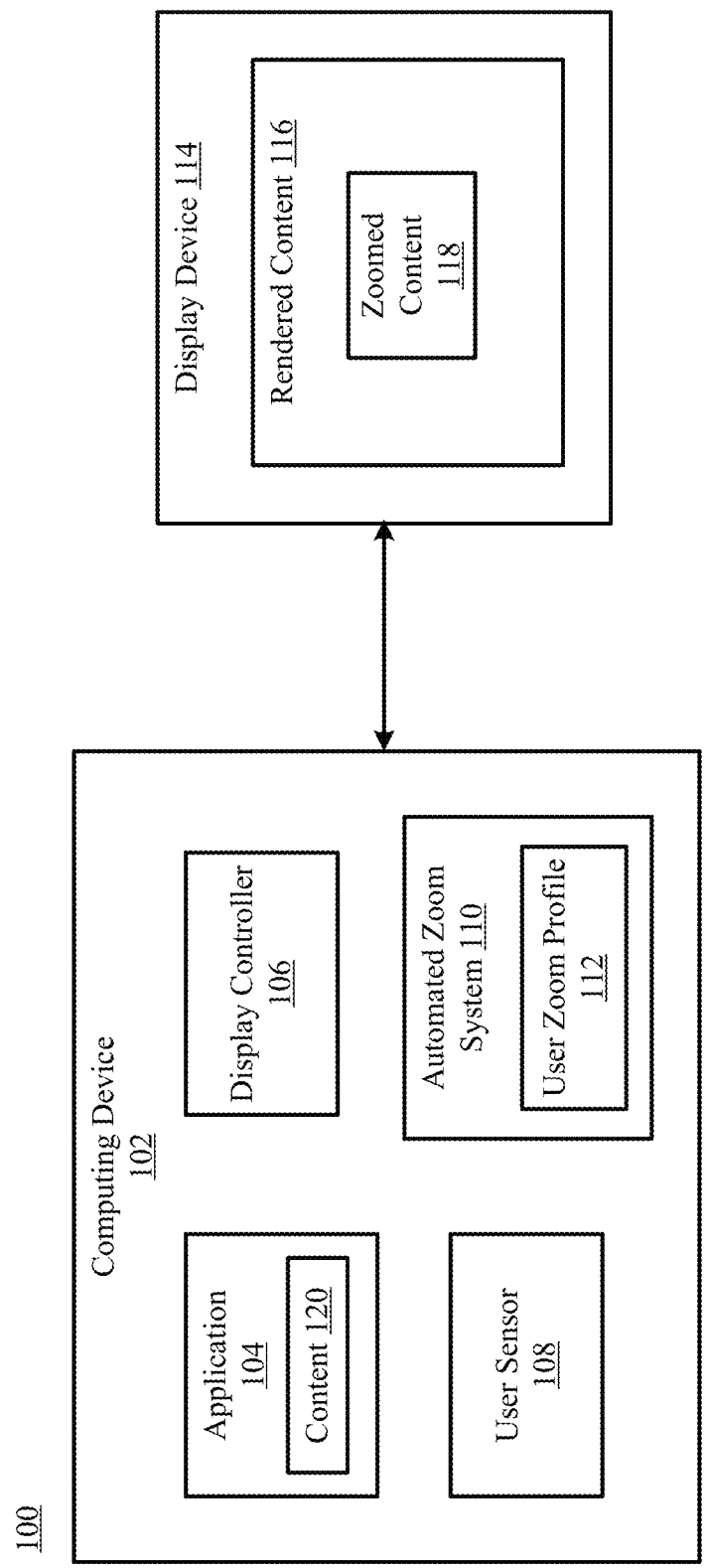
FIG. 1 shows a block diagram of a system for adjusting a display zoom setting, according to an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Various improvements to display devices coupled to computers have occurred over time, such as increasing the screen size and resolution. Despite these improvements, computing device users often still have to alter the manner in which content is rendered on a display to improve their ability to view such content, such as by enlarging text to enhance its readability.

One technique for enlarging content rendered on a screen requires a user to manually interact with a zoom control. With such a technique, a provides some user input to an application rendering the content via a mouse, keyboard, or touch screen. In many instances, the process requires trial of various zoom levels until a desired magnification is reached. When the zooming is no longer needed (or a different zoom is desired), additional trials are required for the user to find the subsequent zoom level that is acceptable. Each time a different zoom level is utilized, processing cycles (e.g., by a graphics processor) are utilized to re-render content on the screen.

In another technique, a proximity between a user and a screen is utilized to control a zoom level. Such a technique, however, often fails to accurately provide a desired zoom level for a user, thus requiring the user to manually alter the zoom. In addition, this technique does not take into account different types of movements associated with a user, resulting in incomplete overall solution.

Embodiments described herein are directed to adjusting a display zoom setting. In an example system, content is displayed on a display device according to a first zoom profile, such as an initial zoom profile. The initial zoom profile identifies different zoom values for different lean angles, where the lean angles are based on a position of a user of a computing device in a direction parallel to the display device (e.g., a side to side movement). Zoom behaviors of the user are observed over a period of time, where the zoom behaviors are based on detecting a set of user movements. The initial zoom profile is calibrated based on the observed zoom behaviors to generate a zoom profile for the user. Using the zoom profile for the user, content is displayed on the display device and zoomed according to the parameters of the zoom profile. In this manner, zooming behaviors specific to a user based on their physical movements can be tailored, resulting in an improved user interface experience (e.g., by improving ability to view and/or interact with content).

The techniques described herein advantageously provide improvements to computing components, and in particular, the operation of computer displays. For instance, by tailoring a zoom profile to an individual user based on that user's own movement habits (e.g., side to side movements), zooming functions on the display can be performed with little or no user input, resulting in accurate resizing of various types of graphical user interface (GUI) elements on the display. Such accurate resizing reduces, or even eliminates, the need for a user to manually adjust a zoom value in a trial and error fashion (where such trial and error results in increased processing cycles due to numerous renderings of content on the screen each time a zoom value is changed). With implementation of the disclosed techniques, since automated resizing can be achieved in an accurate manner, additional processing cycles need not be utilized in an effort to identify a zoom value that is desired by the user.

Still further, improvements to a graphical user interface are also achieved in accordance with techniques described herein. For instance, since zooming actions can be tailored to a given user in a personalized manner, resizing of a screen (or a portion thereof) can be carried out with little to no user input, resulting in display zoom preferences for a user being applied in a quicker (and more accurate) fashion. Such improvements therefore improve both the user interface (e.g., by changing the appearance of content displayed on a display screen in a manner that results in an improved overall ease of use and/or without requiring a manual user interaction) as well as the user experience in interacting with content presented thereon.

In addition, the automated zooming technique described herein allow for improved usability of existing types of display device hardware. For instance, since selective zooming of an area of a display can be performed in an automated fashion as described herein, larger display devices (which can utilize more power) or display devices with greater resolution (which can utilize more processing resources) can be avoided, which can result in reduced processing cycles and/or a reduction in power consumption.

In addition, learning user behaviors based on a movement of a user in a direction parallel to the display (and/or automatically zooming based thereon) enables a user zoom profile to be generated in a manner that takes into account the positional preferences and/or limitations of a user in a horizontal direction (such as where a user can lean more towards ones side versus the other), which improves an overall usability and accessibility of the display device. In addition, learning and zooming based on this horizontal direction allows for selectively zooming portions (e.g., left or right areas) of a screen depending on the user's horizontal movement, which allows for improved utilization of existing hardware (e.g., by reducing the need for larger displays).

Embodiments are implemented in various ways to adjust a display zoom setting for a display device. For instance, FIG. 1 shows a block diagram of a system 100 for adjusting a display zoom setting, according to an example embodiment. As shown in FIG. 1, system 100 includes a computing device 102 and a display device 114. Computing device 102 includes an application 104, a display controller 106, a user sensor 108, and an automated zoom system 110. Application 104 comprises content 120 that is to be rendered on a display device. Automated zoom system 110 comprises a user zoom profile 112 that defines zoom parameters for a user. As shown in FIG. 1, display device 114 comprises rendered content 116. Rendered content 116 comprises zoomed content 118.

In embodiments, computing device 102 and display device 114 are communicatively coupled via any combination of a wired and/or wireless connection. Examples such connections include, but are not limited to, an internal wired connections (e.g., a bus, a video interface, etc., such as in the case of notebook devices, tablets, smartphones, etc.), a High-Definition Multimedia Interface (HDMI) cable, a video graphics array (VGA) cable, a universal serial bus (USB) cable, digital video interface (DVI) cable, a DisplayPort interface, a component video interface, a composite video interface, and a coaxial video interface, a Bluetooth™ interface, an infrared (IR) connection, and/or a network connection (e.g., a local area network (LAN), a wide area network (WAN), an enterprise network, the Internet, etc.).

In embodiments, display device 114 is coupled to computing device 102 and configured to render content (e.g., application content, text, graphics, images, videos, etc.) based on a video signal received from computing device 102. In examples, display device 114 comprises a liquid crystal display, cathode ray tube display, light-emitting diode display, a plasma display, a projector, or any other type of display that is coupled to computing device 102 for rendering content (i.e., a collection of pixels) based on a video signal therefrom. In some examples, display device 114 is external to computing device 102, such as a standalone monitor or television, and is connected to computing device 102 via a communication interface. In other examples, display device 114 is physically coupled to computing device 106, such as a display of a table computing device or laptop computer. For instance, display device 114 comprises a display that is movably attached (e.g., at a pivot point) to computing device 102.

In examples, computing device 102 comprises any type of stationary or mobile computing device, including a mobile computer or mobile computing device (e.g., a Microsoft® Surface® device, a personal digital assistant (PDA), a laptop computer, a notebook computer, a tablet computer, a netbook, etc.), a desktop computer, a server, a mobile phone or handheld device (e.g., a cell phone, a smart phone, etc.), a wearable computing device (e.g., a head-mounted device including smart glasses, a smart watch, etc.), an Internet-of-Things (IoT) device, or other type of stationary or mobile device. Computing device 102 is not limited to a physical machine, but may include other types of machines or nodes, such as a virtual machine. In accordance with an embodiment, computing device 102 is associated with a user (e.g., an individual user, a group of users, an organization, a family user, a customer user, an employee user, an admin user (e.g., a service team user, a developer user, a management user, etc.), etc.). In an example, computing device 102 interfaces with other components illustrated in FIG. 1 through APIs and/or by other mechanisms. In various embodiments, computing device 102 and display device 114 comprise a single apparatus, such as a computing device with screen attached thereto. In other examples, computing device 102 is separate from display device 114.

Application 104 comprise any program that provides content 120 for rendering on display device 114. In examples, application 104 comprises software installed on, executing on, or accessible via computing device 102. In implementations, application 104 provides content 120 to be rendered from information stored locally to computing device 102 and/or information obtained remotely (e.g., via a cloud). In various embodiments, content 120 includes text, images, videos, graphics, graphical user interface elements, etc.

In an example, application 104 provides content 120 to display controller 106. Display controller 106 comprises hardware and/or software components that obtain content 120 transmits a signal to display device 114 to cause the display device to display rendered content 116. In one example, display controller 106 comprises a graphics processing unit (GPU), a graphics card, or other graphics controller. In various examples, display controller processes content 120 based on one or more parameters of the display (e.g., display device 114) on which the content will be rendered, such as by processing the content to take into account the display's resolution, display size, frame rate, communication interface used by the display, etc. In this manner, display controller 106 controls the manner in which content 120 is provided to display device 114 for rendering. In an implementation, rendered content 116 comprises the content rendered on the display as processed by display controller 106.

User sensor 108 comprises hardware and/or software to detect the presence and/or location of a user of computing device 102. In various embodiments, user sensor 108 comprises a hardware device (e.g., a sensor) communicatively coupled to computing device 102, such as a camera, a radar sensor, a Time of Flight (ToF) sensor, a person sensor, an ultra-wideband sensor, etc. In some implementations, user sensor 108 is mounted on or physically attached to (e.g., integrated with a common housing as) display device 114 and/or computing device 102. In one example, user sensor 108 comprises a sensor that is placed in a base portion of a laptop computer wherein the base portion is movably (e.g., rotatably) attached to display device 114. In another example, user sensor 108 comprises a sensor (e.g., a front-facing camera) that is part of a common housing of display device 114 (e.g., in a display bezel portion thereof). In yet another example, user sensor 108 comprises an external sensor that is communicatively coupled (e.g., via a wired connection, such as USB, or via a wireless connection) that is positioned in a manner to capture a user of computing device 102.

In various embodiments, user sensor 108 is configured to identify a position of the user relative to display device 114 (and/or relative to computing device 102). For instance, user sensor 108 identifies a proximity of the user relative to display device 114 and/or computing device 102 along a plurality of axes. In one example, user sensor 108 is configured to identify a distance of the user along an axis parallel to an axis display device 114 (e.g., a distance measuring how far left, right, up, or down a user is relative to a display device). In another example, user sensor 108 is configured to identify a distance of the user along an axis perpendicular to an axis of display device 114 (e.g., a distance measuring how close a user is to the display device). In this manner, user sensor 108 is configured to determine a relative position of a user with respect to display device 114 (and/or computing device 102).

Learning user behaviors based on a movement of a user along an axis perpendicular to an axis of the display device (and/or automatically zooming based thereon) enables the zoom profile to be generated in a manner that takes into account different positional movements of the user in a different dimension, which improves the usability and accessibility of displays. Such techniques allow for more accurate zooming to be performed based on user movements, which can reduce the number of zoom actions performed (e.g., by reducing or eliminating trial and error zoom actions performed by the user, which utilizes graphics processing power). In addition, a proximity based learning and/or automatic zooming allows the zooming to be performed with reduced processing, as the learning and/or automatically zooming can be performed based on a simplified set of information (e.g., a scalar value representing the user distance to the display), thereby also reducing the latency in performing automatic zooming. Still further, when combined with movements in a different dimension (e.g., horizontal movements), the zoom profile is generated with increased granularity, further enhancing the accuracy of the automatic zooming that can be performed.

While examples are described herein in which user sensor 108 identifies a position of a user of computing device 102, it should be understood that the user sensor 108 identifies a position of any portion of the user (e.g., a head of the user, one or more eyes of the user, or other facial features).

In examples, automated zoom system 110 is configured to automate a zooming of content rendered on display device 114 in various ways. In accordance with disclosed embodiments, automated zoom system 110 automates the zooming of such content based on one or more positions of a user of computing device 102, such as a position along one or more axes relative to display device 114 (and/or computing device 102), as will be described in greater detail below. In various examples, automated zoom system 110 causes display controller 106 to zoom in or zoom out on at least a portion of content displayed in display device 114, such as by selectively zooming on a portion of the screen in response to a movement of the user.

In various examples, automated zoom system 110 applies user zoom profile 112 to determine a degree of zoom to cause display controller 106 to apply. User zoom profile 112 specifies, for instance, a set of zoom parameters for one or more users that identifies one or more zoom percentages and/or corresponding lean angles of the user for which automated zooming occurs. In one example, user zoom profile 112 comprises zoom parameters learned or defined for a particular user, based on past movements of the user or other user inputs corresponding to the user. Although not shown expressly in FIG. 1, automated zoom system 110 also applies a default zoom profile (e.g., an uncalibrated or non-personalized zoom profile) in some implementations. In accordance with various examples, automated zoom system 110 is configured to learn user behaviors over a period of time (or receive one or more user inputs) to generate user zoom profile 112 profile therefrom.

In an illustrative example, automated zoom system 110 initially applies a default zoom profile for a user, where the default zoom profile has one or more predefined zoom parameters (zoom percentages, lean angles, etc.). For instance, based on the predefined zoom parameters, display controller 106 adjusts a zooming of content rendered on display device 114 according to the parameters and a movement of the user of computing device 102, such as by zooming to a certain percentage (e.g., enlarging content by a particular value) based on a movement of the user (e.g., the user's head, body, etc. as detected by user sensor 108) to the left and/or right (or front/back) relative to display device 114. In an example, the default zoom profile defines a level of zooming corresponding to the horizontal (e.g., left/right) movements of the user. In some implementations, automated zoom system 110 causes display controller 106 to selectively zoom a portion of the content rendered on display device 114, such as a left portion or right portion of the display, depending on the detected user movement (or more granular portions, such as particular windows, user interface elements, etc.) and/or objects currently focused on by the user based on eye tracking or other similar techniques.

Over time, automated zoom system 110 is configured to learn zoom behaviors and/or movements of the user, such that the default zoom profile is calibrated for the user to generate a user-specific zoom profile. In some examples, the learned zoom behaviors comprise behaviors in which the user is detected to have focused on content rendered in display device 114 while exhibiting a movement (e.g., a horizontal movement), such as by implementing eye-tracking or other attention-tracking techniques.

As will be appreciated to those skilled in the art, a similar process can be taken for a plurality of users, such that each user has an associated user profile tailored to their specific movement behaviors. When a given user accesses computing device 102 (e.g., based on authentication, logging in to an application or service, facial recognition, biometric identification, etc.), the user's profile is selected and applied by automated zoom system 110 to zoom content rendered on display device 114 for that user. In this manner, user zoom profile 112 is generated in a manner that is tailored to a given user's movement behaviors, allowing for more accurate automated zooming.

Figure 2:
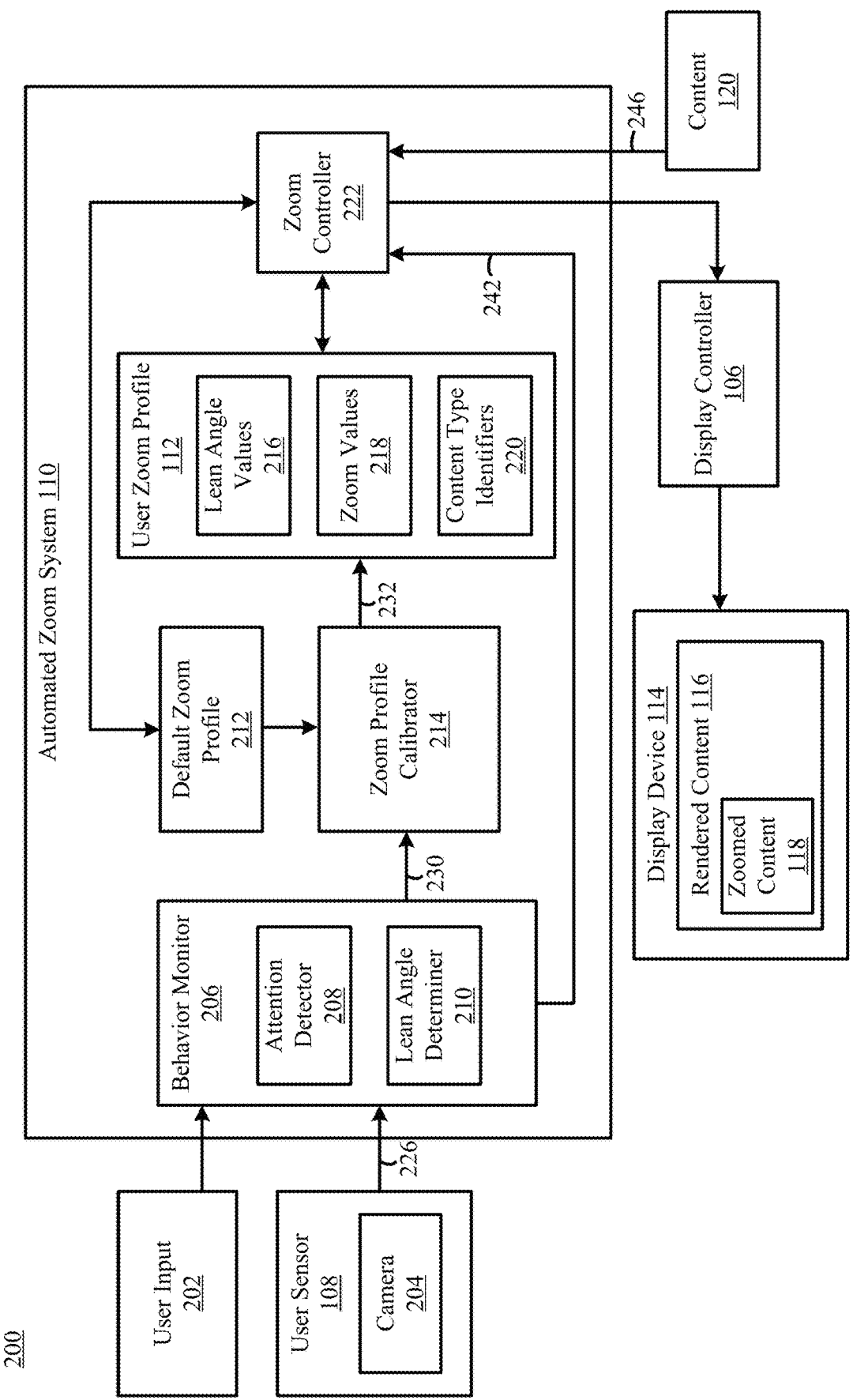
FIG. 2 shows a block diagram of another system for adjusting a display zoom setting, in accordance with an example embodiment.

FIG. 2 depicts a block diagram of a system 200 for adjusting a display zoom setting, in accordance with an example embodiment. As shown in FIG. 2, system 200 comprises a user input 202, an example implementation of user sensor 108, an example implementation of automated zoom system 110, an example implementation of display controller 106, an example implementation of content, and an example implementation of display device 116. User sensor 108 comprises a camera 204. Automated zoom system 110 comprises a behavior monitor 206, a default zoom profile 212, a zoom profile calibrator 214, an example implementation of user zoom profile 112, and a zoom controller 202. Behavior monitor 206 comprises an attention detector 208 and a lean angle determiner 210. User zoom profile 212 comprises lean angle values 216, zoom values 218, and content-type identifies 220. Display device comprises an example implementation of rendered content 116, and rendered content 116 comprises an example implementation of zoomed content 118.

User input 202 comprises any input received by a user during operation of computing device 102, including but not limited to interactions with one or more interactive controls (e.g., menus, buttons, sliders, character inputs, mouse input, touchscreen interaction, voice input, etc.). In examples, user input 202 comprises a user action that is received during rendering of rendered content 116 to manually alter a zoom percentage (e.g., to change the magnification of one or more portions of rendered content 116). In various embodiments, such user actions are detected and/or logged by behavior monitor 206, such that the detected user actions are used to calibrate the user zoom profile. For instance, user preferences (e.g., zoom percentages or other zoom parameters described herein) regarding zoom behaviors are learned such that those preferences are used to generate a zoom profile tailored to the user. In some implementations, user input 202 comprises an input to zoom profile calibrator 214 to manually input, edit, delete, and/or view one or more parameters of user zoom profile 112, enabling the user zoom profile to be manually configured.

Camera 204 comprises a sensor of display device 112 and/or computing device 102 for capturing luminance values for a plurality of pixels. In examples, camera 204 comprises any type of light capturing element, including but not limited to a complementary metal-oxide semiconductor (CMOS) sensor, a charge-coupled device (CCD) sensor, or other pixel array for capturing red, green, and blue (RGB) pixel information. While examples are described herein in which user sensor 108 comprises a camera, it should be understood that those examples are not intended to be limiting. Rather, in various implementations, disclosed techniques are implemented with other types of sensors (e.g., radar, time of flight, etc.) as will be appreciated to those skilled in the art. In various embodiments, user sensor 108 is configured to identify a position of a user of computing device 102, which includes a position in one or more axes relative to computing device 102 and/or display device 114 (and/or a position relative to user sensor 108).

Attention detector 208 is configured to determine if an attention criteria is satisfied for the user of computing device 102. In examples, the attention criteria indicates whether the user's attention is focused on display device 114. In various examples, attention detector 208 obtains information 226 from one or more sensors (e.g., user sensor 108) to determine whether the attention criteria is satisfied. In one example, attention detector 208 determines, based on camera 204, whether the user's face is positioned towards display device 114. In another example, attention detector determines, based on camera 204, whether the user's eyes are facing display device 114. In various other examples, attention detector utilizes any other type of attention tracking or eye tracking techniques to determine whether the user's attention is directed towards display device 114. In implementations, the attention criteria is satisfied where the user's attention is directed toward display device 114, and is not satisfied where the user's attention is not directed towards display device 114.

In a further example, attention detector 208 is configured to determine a specific area of display device 114 on which the user's attention is directed. For instance, using eye tracking or other attention tracking techniques (e.g., based on the camera or one or more other sensors), attention detector 208 determines an area of the display device that the user is currently looking at. In various examples, the area of the display comprises a particular application, window, portion of text, portion of a graphical user interface element, portion of an image or video, or any other portion of the screen that is smaller than the entire area of the display device.

As will be described in greater detail below, a determination that the attention criteria is satisfied is utilized during calibration (e.g., learning of user behaviors) of a user profile, and/or during the automated zooming in various examples. For instance, zoom profile calibrator 214 only utilizes learned behaviors 230 while the attention criteria is satisfied (e.g., does not calibrate a profile when the user's attention is not on the display device). In another scenario, zoom controller 222 only performs an automated zoom based on a detected movement of the user where the user's attention is on the display device. In yet another example, an area of the display device on which the user's attention is directed is utilized by zoom controller 222 to selectively zoom a particular portion of content (e.g., by zooming a particular window) based on a detected movement of the user.

Lean angle determiner 210 is configured to obtain information 226 from user sensor 108 to determine a lean angle for the user of computing device 102. In examples, the lean angle defines a position of the user of computing device relative to display device 114 (and/or relative to computing device 102). In various embodiments, the lean angle represents a viewing position of the user relative to display device 114. In implementations, the lean angle specifies a distance (which includes an angle in various examples) based on one more axes. For instance, the lean angle identifies a distance (e.g., a horizontal distance or a vertical distance) of a user along an axis that runs parallel to an axis of display device 114. In another example, the lean angle identifies a distance (e.g., a proximity of the user towards the display device) of the user along an axis that runs perpendicular to an axis that goes through display device 114. In other examples, the lean angles identifies a combination of the foregoing distances, such to identify the position of the user relative to display device 114 (and/or computing device 102) in two or three different dimensions. In this manner, lean angle determiner determines the position of the user relative to display device 114 (and/or computing device 102), in a left or right direction, an up or down direction, and/or a forward or backward direction.

It should also be understood that while examples are described herein in which the lean angle is determined for a user relative to display device 114, such a lean angle can also be determined relative to computing device 102 (in addition to, or as an alternative to determining a lean angle relative to the display device). For brevity, references to a lean angle relative to display device 114 will also include a lean angle relative to computing device 102. In addition, it should further be understood that while lean angle determiner 210 determines a distance of the user relative to display device 114, the lean angle is not limited to a distance (e.g., a unit of length). In other examples, the lean angle comprises any measure indicative of a position of the user relative to display device 114, including but not limited to, an angle based on the position of the user (e.g., the user's head, eyes, etc.) and display device 114. Illustrative examples of various positions of a user relative to display device 114 are illustrated in FIG. 4, FIGS. 5A-5D, and FIG. 7, all of which will be described in greater detail below.

In some examples, lean angle determiner 210 is configured to filter out certain movements that are not indicative of position changes of the user. In one example, lean angle determiner 210 determines if a user movement has occurred based on detecting a movement outside of a movement threshold surrounding a previous user position. In this manner, lean angle determiner 210 filters out relatively minor movements (e.g., scratching one's head) of the user that are unrelated to zooming actions.

Default zoom profile 212 comprises an initial zoom profile that is not calibrated based on the behaviors of the user of computing device 102. In various embodiments, the default zoom profile comprises one or more default or initial magnitudes of expansion and/or contraction (e.g., zooming levels) of content rendered on display device 114 as a function of the lean angle detected for a user. For instance default zoom profile 212 comprises a predefined set of zoom parameters (e.g., lean angle values, zoom values, and/or content based values, each of which will be described in further detail below). In one implementation, default zoom profile 212 is a zoom profile generated for a general population of users. In another implementation, default zoom profile 212 is generated for a subset of such users based on characteristics of the user (e.g., the user's physical characteristics such as their height) and/or user's computing needs/ preferences (e.g., a primary purpose of the use of the computing device, such as for word processing, gaming, graphics editing, etc.). In another example, default zoom profile 212 comprises a zoom profile for another user that was previously calibrated based on that user's behaviors and/or preferences. In another example, default zoom profile 212 is selected (e.g., based on user input 202) from among a plurality of default zoom profiles presented to the user.

In various examples, zoom profile calibrator 214 observes user behaviors as determined and/or measured by behavior monitor 206 (e.g., positions of the user, user inputs, the attention of the user, etc.) over a period of time during operation of computing device 102. For instance, zoom profile calibrator 214 identifies one or more lean angles historically observed for the user, along with a corresponding value of zoom that is provided on display device 114 for one or more types of content, and calibrate the zoom profile to generate user zoom profile 112.

For example, zoom controller 222 is configured to initially apply default zoom profile 212 during the user's operation of computing device 102, and behavior monitor is configured to monitor user behaviors during such operation (which includes measuring the user's position relative to the display device, and/or zooming actions performed such as automated zooming based on the default zoom profile) while the user is viewing and/or interacting with content presented on the display device. In other words, the user position relative to the display and an associated degree of expansion (e.g., zooming) is obtained and learned over time to determine preferences of the user with respect to positions and degrees of expansion of content displayed on the device. Based on such monitoring, zoom profile calibrator 214 generates a user-specific zoom profile (user zoom profile 112). For instance, user zoom profile identifies a first lean angle (e.g., a first horizontal lean angle to the left of the display) and a corresponding zoom value, a second lean angle (e.g., a second horizontal lean angle to the left of the display) and a corresponding zoom value, a third lean angle (e.g., a third horizontal lean angle to the right of the display) and corresponding zoom value, and so on. In this manner, zoom profile calibrator 214 generates a zoom profile tailored to the user of computing device 102.

User zoom profile 112 comprises a set of zoom parameters, including lean angle values 216, zoom values 218, and content type identifiers 220. In embodiments, default zoom profile 212 also contains an initial or predefined set of such parameters. In examples, lean angle values 216 comprise one or more lean angles defined for the user of computing device 102 based on the user's monitored behaviors. In one example, lean angle values 216 comprise one or more lean angle thresholds that indicate whether a zoom action should be performed below and/or above the threshold value. For instance, the threshold indicates that automated zooming to a given zoom value (e.g., based on zoom values 218) should occur after the user's detected lean angle (based on a current position) moves to (or beyond) a threshold lean angle. In an illustration, such lean angle thresholds would allow for automated zooming to begin after the head of the user moves in a left horizontal direction at a first threshold, and reach a maximum zoom value at a second threshold.

In another example, lean angle values 216 comprise one or more lean angles for which a corresponding zoom value is specified. In one example, each lean angle specified in lean angle values comprises a respective zoom value, such that when the user's position is at the lean angle (or within a defined threshold within the lean angle), the corresponding zoom value is applied. In such an illustration, the lean angles and corresponding zoom values are specified in a table (e.g., a lookup table or other database), or any other data structure, which identifies a particular zoom value for a given lean angle. In another illustration, one or more lean angle ranges are specified, with each lean angle range comprise a first and second lean angle and respective first and second zoom values associated with each lean angle. In such an illustration, zoom controller 222 is configured to adjust a zoom level between the first and second zoom values as the user's position moves between the first and second lean angles (e.g., by adjusting the zoom linearly in this range).

In examples, zoom values 218 comprise one or more parameters that define a level of zooming of content (or a portion thereof) rendered on display device 114. In embodiments, a level of "zoom" or "zooming" of content referred to herein comprises an amount of enlargement (e.g., expansion) or contraction of content on display device 114. In examples, zoom values are specified as a percentage (e.g., a magnification), a scalar, or other value indicative of an amount by which the size of content is to be rendered. Any number of zoom values 218 are specified in zoom values 218. In various examples, each zoom value corresponds to a particular lean angle value, which is stored in any suitable data structure.

Content type identifiers 220 comprise identifications of a type of content. As used herein, a type of content refers to a category of content rendered on display device 114. For instance, types of content include text viewing/editing, browsing, spreadsheets, programming, graphics, images, videos, gaming, etc. The foregoing list of only illustrative, and any category of content that can be rendered on display device 114 is contemplated. In accordance with examples, each type of content corresponds to a lean angle and zoom value (or a set of lean angles and zoom values). For instance, for a first type of content (e.g., text viewing/editing), a first set of lean angles and zoom values are specified, such that zoom controller 222 automates the zooming based on the user's current position and the zoom parameters relating to text viewing/editing, while for a second type of content (e.g., browsing), a second set of lean angles and zoom values are specified such that a different set of zoom parameters are applied when the second type of content is rendered. In this manner, zoom controller 222 applies different zoom parameters based on the type of content currently being rendered.

Learning user behaviors and/or automatically zooming based on a type of content enables zooming to be performed with increased accuracy. For instance, a given user may not recall what zoom values are preferred when the user position changes for each different content type, and as a result may perform many zoom actions (each of which requires graphics processing to render content) until the appropriate zoom is achieved. With implementation of the disclosed techniques, the zooming can be learned across different content types, and predict the appropriate zooming for each individual content type, resulting in reduced graphics processing (e.g., by reducing the number of zoom renderings performed). In addition, such techniques further improve the usability and accessibility of a display device (and GUIs rendered thereon), by learning the user habits for different types of content rendered and automatically zooming based on those learned habits (e.g., by allowing for increased zooming for one type of content such as text editing, versus another type of content such as web browsing). In addition, such techniques allow for automatic zooming to be performed with minimal to no user input, as the zooming is able to be performed based on identification (e.g., an automatic identification) of content rendered on the screen, thereby further improving the GUI.

In examples, zoom controller 222 is configured to apply default zoom profile 212 or user zoom profile 112 to content 120, such that display device 114 renders zoomed content 118 according to parameters defined in the applied zoom profile. In examples, zoom controller 222 obtains information 242 from behavior monitor, such as a current position of the user of computing device and/or a determination of whether an attention criteria for the user is satisfied, and provide a signal 244 to display controller 106 based on accessing information from the applied zoom profile.

Based on the user zoom profile, which is generated based on the past user positions and associated degrees of expansion (e.g., zooming values), zoom controller 222 causes content to be rendered on display device 114 as a function of a detected user position (e.g., a lean angle) in an example, such that the user need not position themselves outside of a reasonable range (either in a horizontal direction or in another direction, such as towards the display) to achieve a desired degree of expansion of content. Such techniques, as described in greater detail herein, allows for a degree of expansion of content displayed on display device 114 to be changed as a function of a detected user position relative to the display device and/or customized to individual users, allowing the positions of the user to remain within a reasonable range to obtain desired degrees of expansion. In other words, in accordance with various embodiments, the user need not reposition themselves (e.g., by leaning too close to a display, too far left, too far, right, etc.) to achieve a desired zooming of content.

In some further examples, zoom controller 222 obtains an identification 246 of a content type of content 120 and applies content-specific zoom parameters corresponding to the content type from the applied zoom profile, such that the identified type of content is automatically zoomed on display device 114. In yet another example, zoom controller 222 determines an area of the display device that the user is currently focused on (e.g., based on information obtained from attention detector 208), and selectively zoom a portion of display device 114 corresponding to that area. Additional details regarding the operation and functionality of automated zoom system 110 are described below.

Figure 3:
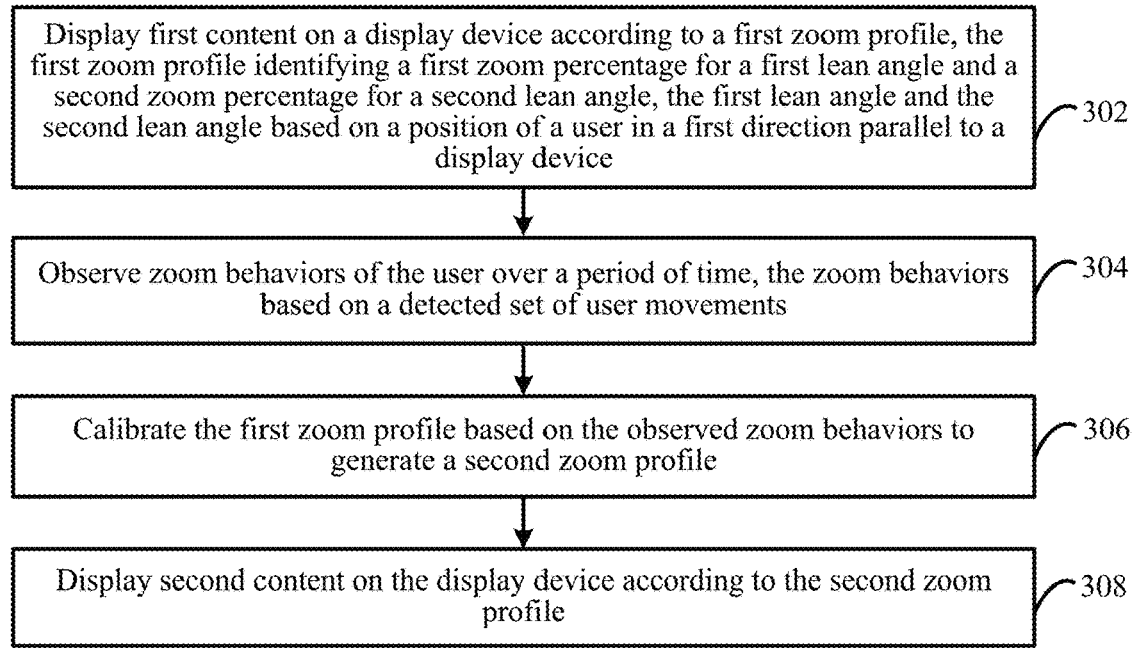
FIG. 3 shows a flowchart of method for adjusting a display zoom setting, in accordance with an example embodiment.

In accordance with one or more embodiments, user behaviors are monitored to generate a user-specific zoom profile. For example, FIG. 3 shows a flowchart 300 of a method for adjusting a display zoom setting, in accordance with an example embodiment. In an embodiment, flowchart 300 is implemented by system 100 as shown in FIG. 1 and/or system 200 as shown in FIG. 2. Accordingly, flowchart 300 will be described with reference to FIGS. 1 and 2. Other structural and operational embodiments will be apparent to persons skilled in the relevant art(s) based on the following discussion regarding flowchart 300, system 100 of FIG. 1 and system 200 of FIG. 2.

Flowchart 300 begins with step 302. In step 302, first content is displayed on a display device according to a first zoom profile. In the first zoom profile, a first zoom value is identified for a first lean angle and a second zoom value is identified for a second lean angle, where the first lean angle and the second lean angle are based on a position of a user in a first direction parallel to a display device. For instance, with reference to FIG. 2, zoom controller 222 causes display controller 106 to display a first set of content on display device 114 according to a first zoom profile, such as default zoom profile 222. In examples, as described herein, default zoom profile identifies a plurality of zoom parameters, such as a first zoom value for a first lean angle, and a second zoom value for a second lean angle.

In embodiments, the lean angle (including the first and second lean angle) is based on a position of a user of computing device 102 relative to display device 114. In various embodiments, the lean angle is based on a position of the user in a first direction that is parallel to display device 114, such as a distance along a horizontal direction in an axis that is parallel to display device 114 (e.g., parallel to an axis going through display device 114). For instance, as the user moves in a horizontal direction (e.g., to the left or right relative to display device 114), zoom controller 222 causes display controller 106 to apply default zoom profile 212 to automatically zoom the first content rendered on display device 114. In various examples, the automatic zooming is based on the parameters defined in default zoom profile 212 and the current position of the user, as described herein. In a further example, the automatic zooming is also based on a type of content rendered on display device 114 (e.g., by applying a set of zoom parameters specific to the type of content being rendered).

In another example, learning zoom behaviors is performed based on a type of content rendered in display device 114. For instance, lean angle determiner 210 stores user behaviors along with an identification of a content type, such that a learning curve is generated specific to each type of content (and therefore generate content-specific zoom parameters in user zoom profile 112).

In some examples, default zoom profile 212 comprises a default set of zoom parameters for each different content type. In other examples, zoom parameters specific to a type of content are generated from scratch (e.g., based on learned behaviors associated with that type of content, rather than learned behaviors in combination with a default set of parameters). In some further examples, observed behaviors for one type of content are used to generate an initial set of zoom parameters for another type of content, where the behaviors associated with the rendering of the attention type of content are monitored and used to tweak or fine tune the associated zoom parameters over time. In various embodiments, zoom parameters for each type of content are applied different (e.g., linearly zoom for one type of content, non-linearly zoom for another type of content, etc.).

Utilizing different zoom parameters (e.g. linearly zooming, non-linearly zooming, etc.) depending on the content type allows for numerous benefits, such as by automatically zooming for certain types of content in a manner that utilizes reduced processing (e.g., such as with linearly zooming which performs a zoom as a function of a position between a range) compared to other types of zooming that is performed with increased granularity (e.g., by identifying values using a lookup table or other non-linear fashion). In other words, simplified zooming can be performed in certain instances, thus reducing overall processing usage. In other scenarios, such as where increased granularity is utilized, the accuracy of the automatic zooming is increased, thus reducing the number of manual zooming actions that are performed by a user (which improves the GUI and reduces processor utilization).

In step 304, zoom behaviors of the user are observed over a period of time, where the zoom behaviors are based on a detected set of user movements. For instance, with reference to FIG. 2, attention detector 208 and/or lean angle determiner 210 are configured to monitor zoom behaviors of the user over a period of time. In examples, the zoom behaviors that are monitored are based on a set of movements of the user that are detected over the period of time. For instance, lean angle determiner 210 determines one or more lean angles that the user positions themselves while a zoom action (e.g., an expansion or contraction of rendered content) is occurring. In examples, the zoom action occurs in response to user input 202 (e.g., a manually initiated zoom action), based on application of a default zoom profile by zoom controller 222, or a combination thereof. In various example embodiments, the detected set of user movements are captured by user sensor 108 (e.g., camera 204).

In one implementation, lean angle determiner 210 captures any one or more of the following pieces of information, such as the lean angle of the user (e.g., the amount of movement in one or more axes, the angle of the user relative to the display, etc.), the rate of movement of the user, the type of content rendered on display device 114, a particular area of the display that the user is focused on (e.g., based on information from attention detector 208), interactive actions the user performed to alter a degree of expansion (e.g., zooming actions) before, during, or after the user's movement, actions performed by zoom controller 222 before, during, or after the user's movement, and any other type of information relating to a user's movement and/or zooming of content rendered on display device 114. In embodiments, lean angle determiner 210 stores the such information in a suitable data structure accessible via computing device 102. In one example, lean angle determiner stores a set of zoom actions (e.g., as a percentage, a scalar value, etc. of a degree of expansion) in combination with a detected position of the user (e.g., in one or more axes).

In one illustration, the learned behaviors include a set of lean angles (and corresponding zoom values), where one lean angle indicates a lean angle at which zooming commences, and another lean angle at which zooming is maximized. In embodiments, such lean angles are identified in multiple directions, such as a set of lean angles for a leftward direction relative to the display, and a different set of lean angles in a direction rightward relative to the display. In this manner, behaviors of the user in which the user leans to one direction more or less to one side compared to the other side are identified (e.g., due to accessibility, posture, personal preferences, or other reasons). In other words, the monitored behaviors include positions of the user (or observed patterns) that are asymmetric with respect to display device 114.

In this manner, behaviors of the user (which include a position of the user and corresponding zoom values during the time such a position is identified) are learned, enabling a personalized zoom profile to be generated.

In step 306, the first zoom profile is calibrated based on the observed zoom behaviors to generate a second zoom profile. For instance, with reference to FIG. 2, zoom profile calibrator 214 is configured to calibrate default zoom profile 212 based on the observed zoom behaviors for the user to generate 232 user zoom profile 112. In examples, user zoom profile 112 comprises a set of zoom parameters based on the historical positions of the user and associated zoom actions, such that a personalized zoom profile is generated. For instance, by measuring past lean angles of a user with respect to display device 114 and associated zoom actions, a range of movement of the user (and associated degrees of expansion within that range) is dynamically identified and used to generate the personalized zoom profile for the user. In various examples, user zoom profile 112 comprises a different set of zoom parameters (e.g., different lean angles and/or different zoom values corresponding to such lean angles) following calibration compared to the zoom parameters defined in default zoom profile 212.

In various examples, zoom profile calibrator 214 generates user zoom profile 112 based on an analysis of information (including observed zoom behaviors 230) retrieved from behavior monitor 206, such as a statistical analysis, to identify one or more patterns therefrom. In another example, profile calibrator 214 generates user zoom profile based on inputting information retrieved from behavior monitor 206 to one or more machine learning algorithms to identify one or more patterns therefrom.

For instance, user zoom profile 112 identifies a different (e.g., greater or lesser) range of lean angles in a first direction (e.g., a left direction) compared to the range of lean angles in a second direction (e.g., a right direction), based on the observed positional behaviors of the user and/or zoom actions. In another implementation, user zoom profile 112 identifies a different level of zooming for movements of the user in a first direction compared to a second direction. For instance, where a particular user is observed to lean more to the left and enlarge content to a greater degree compared to when leaning to the right, such observations are utilized in generating user zoom profile 112, allowing the user zoom profile to have different lean angles and zoom values for different directions of user movements, as observed by behavior monitor 206.

It should be understood that example embodiments are not limited to observing user behaviors in a single direction (e.g., a left/right or horizontal direction) and generating a user profile based thereon. Rather, in various implementations, user behaviors are observed in any combination of directions or dimensions, such as a horizontal, vertical, and/or proximal direction (e.g., movements closer or farther) relative to display device 114, and generating user zoom profile 112 based on such observations. For instance, user behaviors in which the user moves closer or farther to the display while moving to the left or right (in combination with a zooming action) are also observed in an illustration, and such behaviors are used to generate user zoom profile 112. In another example, techniques described herein are utilized to identify a range of movement solely in a proximal direction (e.g., movement of the user toward or away from the display device), such that the user zoom profile is generated in a way that automated zooming occurs based on the proximity of the user relative to the display device.

In step 308, second content is displayed on the display device according to the second zoom profile. For instance, with reference to FIG. 2, zoom controller is configured to display a second set of content on display device 114 according to user zoom profile 112. In examples, zoom controller obtains information 242 (such as the current position of the user in one or more directions relative to the display) from behavior monitor 206 as the user is using computing device 102. Based on such information, zoom controller 222 identifies an appropriate zoom value from user zoom profile for the lean angle corresponding to the current user position, and causes display controller 106 to render a set of content according to the zoom value.

In a further implementation, zoom controller 222 also obtains information comprising an area of the display that the user is currently focused on. Based on such information, zoom controller 222 causes display controller 106 to selectively zoom (e.g., according to an identified zoom value) a portion of the content rendered in display device 114, such as a particular window or other portion of the screen.

In another example, zoom controller 222 display controller to automatically zoom a set of content in display device 114 if an indication is received from behavior monitor 206 that an attention criteria for the user is satisfied, thereby preventing unnecessary zoom actions from taking place (and thus preserving processing resources by preventing rendering changes when the user's attention is not on the display device).

While certain examples are described herein in which a user zoom profile is calibrated based on a default zoom profile and the user's observed behaviors, techniques are not limited to such implementations. Rather, in other examples, an initial or default zoom profile need not be present or utilized. For instance, user behaviors (e.g., movements, zoom actions, etc.) are monitored in various other implementations and a user zoom profile is generated based on such monitored behaviors.

The ability to calibrate a user zoom profile and/or automatically zoom content rendered on a display based on observed user behaviors has numerous advantages as described herein. For instance, the accuracy of automated zooming techniques is improved, which reduces the number of manual zoom operations performed on the device (which often are performed in a trial and error fashion until a desired zoom is achieved). By improving the accuracy and using a profile tailored to a given user's own habits, zooming is performed with a reduced number of repeat rendering, thus conserving graphical processing resources. In addition, the graphical user interface is also enhanced in examples by enabling zooming to be performed in a manner desired by a user without requiring the user to manually interact with an interface of the computing device.

Figure 4:
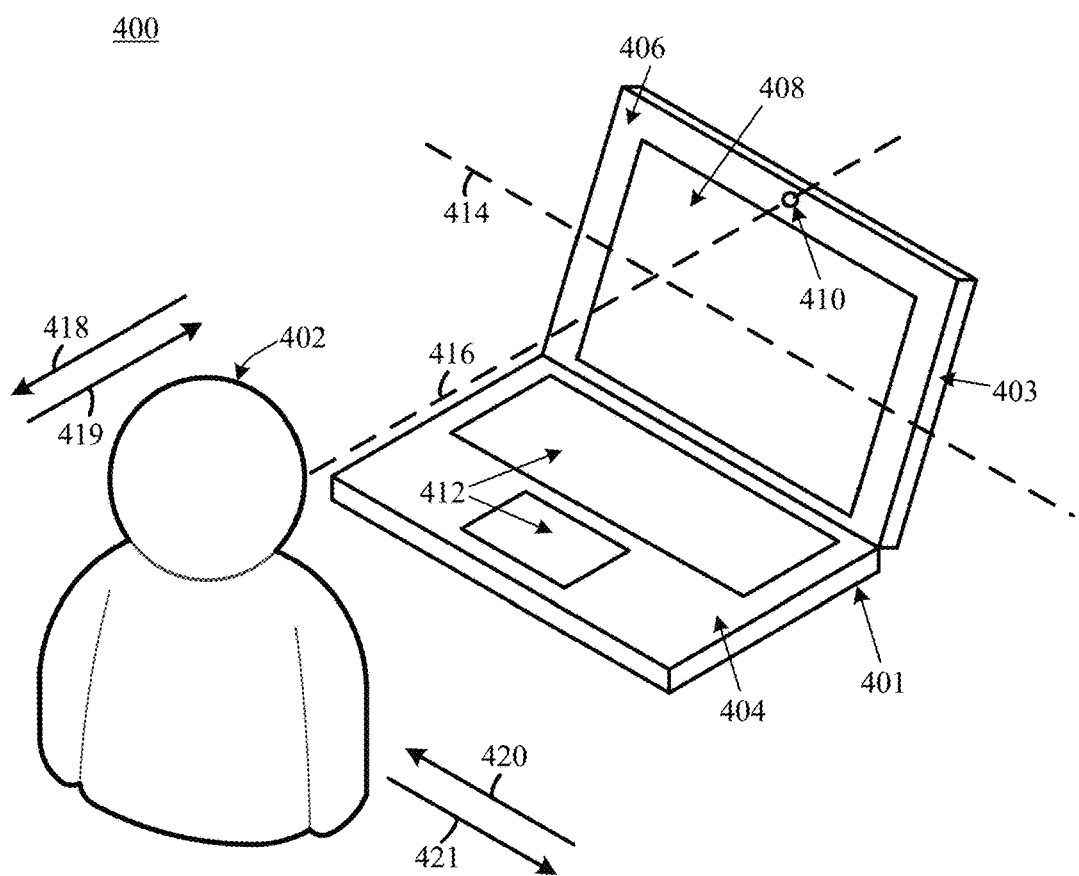
FIG. 4 shows an illustrative system comprising a computing device implementing certain disclosed techniques, in accordance with an example embodiment.

In accordance with various implementations, automated zoom system 110 is configured to identify a position of a user, calibrate a profile for the user based on past behaviors of the user (e.g., positions and/or zooming actions), and/or automatically zoom content (or portions thereof) on a display device based on a current user position. For instance, FIG. 4 shows an illustrative system 400 comprising a computing device implementing certain disclosed techniques, in accordance with an example embodiment. The configuration of the computing device shown in FIG. 4 is only illustrative, and other configurations (e.g., tablets, desktops, etc.) are also possible for implementing the disclosed techniques.

As shown in FIG. 4, system 400 comprises a computing device 401 that is an example of computing device 102 and a user 402 of computing device 401. Computing device 401 comprises a display portion 403 and a base portion 404 that are movably attached to each other (e.g., rotatable with respect to each other). Display portion 403 comprises a display bezel 406, a display 408 (which is an example implementation of display device 114), and a front sensor 410 (which is an example of user sensor 108). In examples, display bezel 406 comprises a portion of display portion 403 that surrounds a periphery of display 408 and is in a plane that is parallel to a plane of display 408. In examples, display bezel 406 houses front sensor 410 (e.g., front sensor 410 is installed within and/or is integral with display bezel 406). Front sensor 410 includes one or more light-capturing sensors (e.g., a camera) or other sensors that are usable to detect a position of a user, as described elsewhere herein.

Base portion 404 comprises a user input 412. In an example, user input 412 comprises a keyboard and a mouse input (e.g., a touchpad or other similar input). In some implementations, such as where display 408 comprises a touchscreen, user input 412 includes the touchscreen input.

As shown in FIG. 4, a first axis 414 runs through a plane of display 408. In addition, a second axis 416 is illustrated that is perpendicular to the first axis. Although not shown herein, a third axis is also present in a vertical direction that runs perpendicular to both the first and second axis.

In accordance with example embodiments, user 402 is a user of computing device 401. In examples, during operation of computing device 401 (e.g., when content is rendered on display 408), user 402 moves in various directions. In one example, user 402 moves in a first direction 420 and/or a second direction 421 that are horizontal relative to display 408. In such an example, the first direction 420 and second direction 421 are parallel with first axis 414. In another example, user 402 moves in a third direction 418 and/or a fourth direction 419, which are parallel with second axis 416. In yet another example, user 402 moves in a fifth and sixth direction (not shown) that are parallel with the third axis (not shown). In various embodiments, user 402 moves in a direction that comprises a combination of any of the first through sixth directions. For instance, user 402 moves towards display 408 while moving in a direction to the left of the display. In another example, user 402 moves towards display 408 while moving in a direction to the right of the display. Thus, while examples are illustrated with respect to user 402 moving along or in parallel with certain directions, it should be understood that the movement of user 402 comprises any movement relative to display 408, where such movement comprises a combination of components of directions along one or more axes (e.g., any combination of movement in the first, second, and third axes).

In various examples, automated zoom system 110 is configured to determine the position of user 402 relative to display 408 based on information from user sensor 410. Based at least on the user position, automated zoom system 110 causes content (or a portion thereof) rendered on display 408 to enlarge or contract, in accordance with zoom parameters specified in user zoom profile 112. In a further implementation, automated zoom system 110 uses the position information to learn historical positions of the user and corresponding zoom actions to calibrate a zoom profile and generate the user zoom profile tailored to user 402.

As a non-limiting illustration, automated zoom system 110 detects if user 402 moves from a first position to a new position that based on a movement in a first direction 420 and a third direction 418. Based on the new position of the user relative to display 408, automated zoom system 110 zooms a portion of the screen to a zoom value, as defined in the user zoom profile.

Figure 5A:
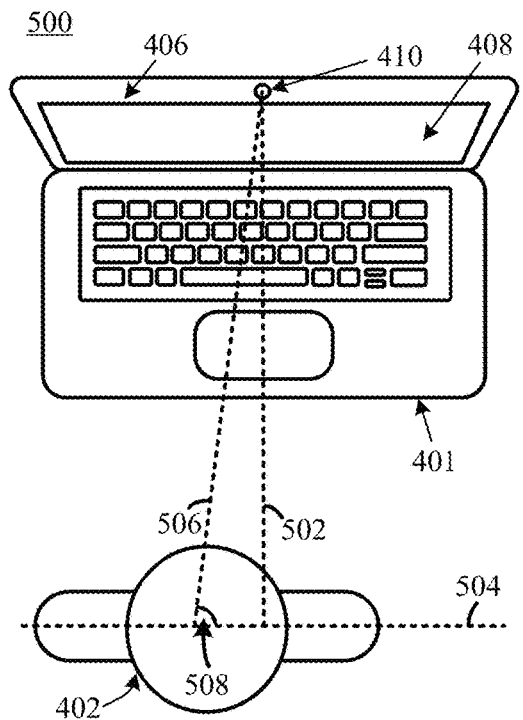
FIGS. 5A-5D illustrate various user movements that are detected by a computing device, in accordance with example embodiments.

FIGS. 5A-5D illustrate various user movements that are detected by a computing device, in accordance with example embodiments. For instance, FIG. 5A shows a system 500 comprising an example implementation of computing device 401 and user 402. In system 500, an axis 504 defines a horizontal movement of user 402, where axis 504 is parallel to an axis going through display 408. In this example, user 402 is positioned in a direction left of an axis 502 that defines a center line of user sensor 410. A distance 506 comprises a length detected by user sensor 410 between the sensor and user 402 (e.g., a face of the user, an eye of the user, or other portion or feature of the user). A first angle 508 identifies an angle between distance 506 and axis 504. In an example, first angle 508 comprises a lean angle of the user relative to display 408.

Figure 5B:
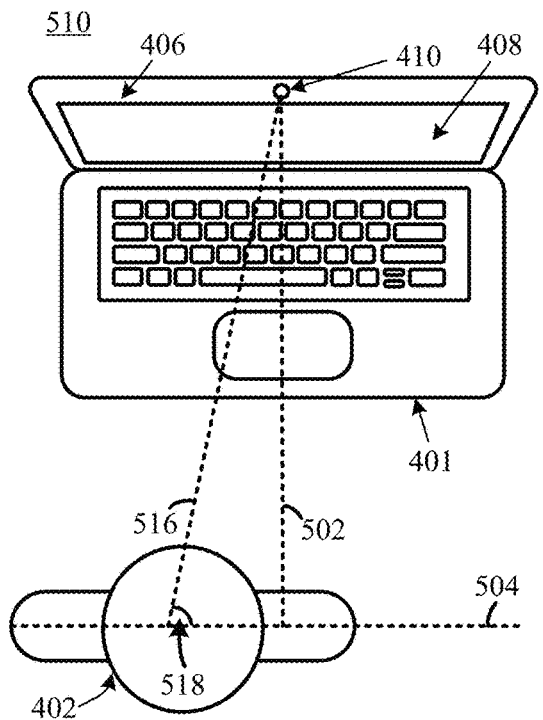

FIG. 5B illustrates a system 510 comprising an example implementation of computing device 401 and user 402 in accordance with another embodiment. In FIG. 5B, a user is positioned at a distance 516 from user sensor 410. A second lean angle 518 results from the positioning as depicted in FIG. 5B, which is a smaller angle relative to the first angle shown in FIG. 5A. In an example, the position shown in FIG. 5A represents a first lean angle of a user, such as where a minimum zooming value is applied, while the position in FIG. 5B represents a second lean angle of the user, such as where a maximum zooming value is applied. In such an example, positions of the user between the first and second lean angles would have different zooming values (e.g., between the minimum and maximum).

It should be noted that the movements depicted are only illustrative. In various scenarios, user 402 moves towards or away from display 408 (e.g., moving in a direction along a dimension that is parallel to axis 502).

Figure 5C:
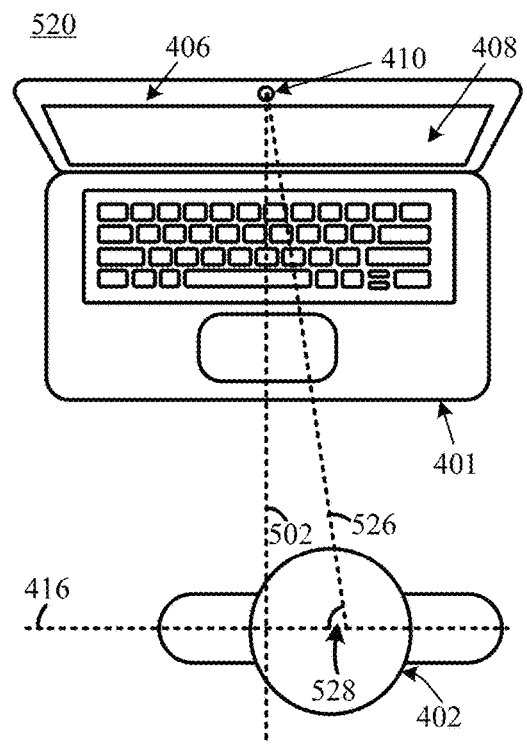

FIG. 5C depicts a system 520 comprising an example implementation of computing device 401 and user 402, in accordance with another embodiment. In FIG. 5C, the user is positioned at a distance 526 from user sensor 410, in a direction that is to the right of the axis 502. In the illustration shown in FIG. 5C, a third lean angle 528 results based on the depicted position of the user. In examples, third lean angle 528 is different than the first or second lean angles described in FIGS. 5A and 5B. For instance, the third lean angle need not be identical for the leftward user positions shown in FIG. 5A or 5B. Rather, in various examples, third lean angle comprises a different value at which a minimum or maximum zoom value is applied. In this way, the zooming of content on display 408 for user 402 is applied differently depending on how far left or how far right a user is positioned relative to display 408 (such as where the user is observed to exhibit a greater or lesser amount of movement to one side compared to the other).

Figure 5D:
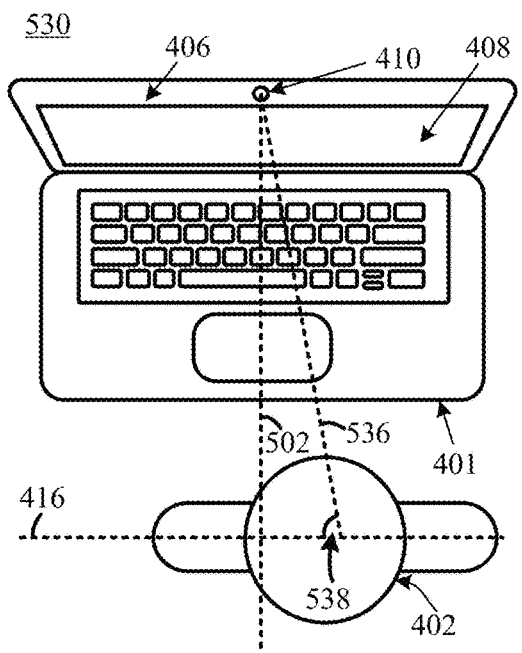

FIG. 5D depicts a system 530 comprising an example implementation of computing device 401 and user 402, in accordance with another embodiment. In FIG. 5D, the user is positioned at a distance 536 from user sensor 410, in a direction that is to the right of the axis 502, similar to FIG. 5C. However, in FIG. 5D, the position of the user has also moved closer to display 408 compared to the position showed in FIG. 5C. Based on the position shown in FIG. 5D, a fourth lean angle 538 results.

Such illustrations are only meant to provide examples of different user positions that are possible in accordance with disclosed embodiments. Any combination of movements is possible, including along any axis or axes.

For example, FIG. 6 shows a flowchart 600 of a method for detecting a set of movements in a plurality of directions, in accordance with an example embodiment. In an embodiment, flowchart 600 is implemented by system 100 of FIG. 1, system 200 of FIG. 2, system 400 of FIG. 4, and/or systems 500, 510, 520, and 530 of FIGS. 5A-5D. Accordingly, flowchart 600 will be described with reference to FIGS. 1, 2, 4, and 5A-5D. Other structural and operational embodiments will be apparent to persons skilled in the relevant art(s) based on the following discussion regarding flowchart 600 and system 100 of FIG. 1, system 200 of FIG. 2, system 400 of FIG. 4, and systems 500, 510, 520, and 530 of FIGS. 5A-5D.

Flowchart 600 begins with step 602. In step 602, a set of user movements that comprise a first movement of the user in a first direction parallel to the display device and a second movement of the user in a second direction perpendicular to the display device is detected. For instance, with reference to FIG. 2, lean angle determiner 210 is configured to obtain information 226 from user sensor 108 that indicates a current position of a user relative to display device 114. In examples, lean angle determiner 210 is also configured to obtain (or access previously obtained) information relating to a prior user position relative to display device 114, such that lean angle determiner 210 determines a current user position relative to a previous user position.

In examples, the detected set of user movements detected by lean angle determiner 210 comprises movements of a user to a current position based on user movements in a plurality of dimensions. For instance, lean angle determiner 210 determines that a user has moved in first direction 420 that is parallel to axis 414 passing through the display device, while moving in third direction 418 that is perpendicular to axis 414. In other words, lean angle determiner 210 is configured to determine that a user has moved to the left/right, toward/back, and/or up/down relative to display device, or any combination of the foregoing.

In implementations, the detected set of movements in the plurality of dimensions are utilized by zoom profile calibrator 214 to generate user zoom profile 112 for the user. For instance, where it is observed that the user movements corresponding to a zoom action (e.g., a particular magnification or range of magnifications) are based on user movements that comprise a component in a horizontal direction while moving closer to the display, zoom profile calibrator 214 generates and stores an appropriate set of lean angle values and zoom values consistent with the user's detected movements in the plurality of dimensions.

In accordance with the disclosed techniques, the user zoom profile is generated in a manner that takes into account more granular movements of the user (e.g., movements in various dimensions), thereby allowing zooming to be performed for a user in a more accurate fashion. As described elsewhere, such improvements enable a reduction in processing resources as well as improvements to a graphical user inface of the computing device.

In some further implementations, zoom profile calibrator 214 only utilizes observed zoom behaviors of the user to generate user zoom profile 112 where user movements are detected in multiple dimensions. For instance, in some examples, zoom profile calibrator 214 does not utilize observed behaviors in which a user moves in a single dimension (e.g., in a left/right or horizontal direction relative to the display), but instead utilizes observed behaviors where the user moves in a horizontal direction as well as closer or farther from the display.

FIG. 7 illustrates various additional user movements that are detected by a computing device, in accordance with example embodiments. For instance, FIG. 7 shows a system 700 comprising an example implementation of computing device 401 and a plurality of positions of a user. As shown in FIG. 7, the illustrative user positions comprise a first user position 706A, a second user position 706B, a third user position 706C, a fourth user position 706D, a fifth user position 706E, a sixth user position 706F, and a seventh user position 706G. In one implementation, certain positions shown in FIG. 7 depict lean angles stored in default zoom profile 212 and/or user zoom profile 112 (e.g., following calibration). These user positions are only illustrative, and various other user positions are detectable by computing device 401 to calibrate and/or automatically zoom content rendered on the display device.

In an example 706A comprises an initial user position, or a resting user position relative to display 408 of computing device 401. Second user position 706B comprises a user position (e.g., a lean angle) to the left of display 408 at which a first zoom value is applied to magnify rendered content on the display (e.g., by applying a 2× magnification). Third user position 706C comprises a user position further left of the display 408 at which a second zoom value is applied to magnify rendered content (e.g., by applying a 3× magnification). Although not shown in FIG. 7, user positions between second position 706B and third position 706C would also result in a zoom value being applied to rendered content, where the zoom value selected from a range between the first and second zoom values. In some implementations, movements further left relative to third user position 706C would not result in further magnification changes (e.g., 706C comprises a position at which the zoom value for leftward positions is at a maximum). In other examples, the zoom value increases as the user position moves further left relative to third user position 706C.

Fourth user position 706D and fifth user position 706E are similar to third user position 706B and third user position 706C, except that fourth user position 706D and fifth user position 706E comprise positions to the right of first user position 706A. In examples, fourth user position 706D comprises an associated zoom value, while fifth user position 706E comprises another associated zoom value. Zooming on the right side can be carried out in a similar fashion as described above with respect to zooming on the left side. It should also be noted that the distances between the first user position 706A, second user position 706B, and third user position 706C need not be the same as the distances between the first user position 706A, fourth user position 706D, and fifth user position 706E. Similarly, the corresponding zoom values for the left and right user positions need not be the same. Rather, in examples, user positions that define zooming on the left can be different than the user positions that define zooming on the right, allowing for a zoom profile to be generated that is tailored to the specific positioning (e.g., leaning behaviors) of a given user. In addition, the zoom values can be any higher or lower than zoom values specified in default zoom profile 212.

As explained elsewhere herein, detected positions of a user are not limited to movements solely along an axis 704. Rather, movements of the user comprise detected movements along multiple dimensions that comprises different components (e.g., movements along two different component directions, such as a leftward and forward movement).

Thus, while examples are illustrated and described with respect to movements in a direction along an axis or parallel with an axis, it should be understood that such movements include movements in which the user is also moving in another direction as well, such that the aggregate movement comprises a combination of the movements in different component directions. For instance, sixth user position 706F and seventh user position 706G represent user positions in which the user has moved from first position 706A to a position that is both forward and left or right. Such positions are contemplated and within the scope of this disclosure.

In addition, identifications of other positions (in addition to, or as an alternative to the depicted positions) in FIG. 7 are also possible. For instance, while the example depicted illustrate a second user position 706B corresponding to a first zoom value (e.g., an initial or minimum zoom) and third user position 706C corresponding to a second zoom value (e.g., a maximum zoom), additional positions can be specified therebetween, such as a median or mean position or zoom value, based on learned user behaviors for example. In addition, while a plurality of positions (and corresponding zoom ranges) are identified along axis 704, a plurality of positions (and corresponding zoom ranges) is also possible along another axis (e.g., in a direction towards the display, indicative of a proximity of the user to the display) using similar techniques as described herein (e.g., by observing behaviors in another axis of movement, capturing zoom actions, and calibrating the user zoom profile to automate zooming for movements in this dimension).

As discussed above, automated zooming is performed based on a resting point of a user in some embodiments. For example, FIG. 8 shows a flowchart 800 of a method for determining a user resting point, in accordance with an example embodiment. In an embodiment, flowchart 800 is implemented by system 100 of FIG. 1, system 200 of FIG. 2, and/or system 700 of FIG. 7. Accordingly, flowchart 800 will be described with reference to FIGS. 1, 2, and 7. Other structural and operational embodiments will be apparent to persons skilled in the relevant art(s) based on the following discussion regarding flowchart 800 and system 100 of FIG. 1, system 200 of FIG. 2, and system 700 of FIG. 7.

Flowchart 800 begins with step 802. In step 802, a resting point is determined for the user. For instance, with reference to FIG. 7, lean angle determiner 210 determines a resting point for the user of computing device 102. In an example, the resting point comprises an operating position or posture of the user determined to be a nominal or resting position, such as where content rendered on the display is neither expanded or contracted. In some implementations, the resting point is at or near a center line 702 of display 408. In some instances, lean angle determiner 210 determines that the resting point for a user is first position 706A which is off-centered in a horizontal direction compared to center line 702. In a further implementation, a proximity of the user relative to the computing device is also determined, such that the resting point identifies a resting point of the user in a two or three dimensional space relative to display 408.

By determining the user's resting point and automatically zooming based on the determined resting point, zooming can be performed in a manner specifically tailored to a particular individual and/or the individual's current posture (which can change numerous times even in a given session). As a result, the manner in which automatic zooming is performed can be continuously updated to account for the resting position, which can result in a reduced number of unintentional zooming actions performed (each of which utilize processing resources). For instance, disclosed techniques identify positional changes of the user that are the result of the user's posture (e.g., resting point), rather than a positional change that necessities a zoom action to be performed. By identifying the resting point and accounting for the resting point when determining whether a zoom action is needed, unnecessary zooming actions can be reduced or even avoided.

In various examples, the resting point of the user is determined based on one or more observed behaviors (e.g., positions) of the user. In some embodiments, the resting point is determined over a period of time (e.g., a learning period) during which a plurality of sessions of the user are monitored to determine the position in which the user normally is located relative to the display. In such an example, user zoom profile 112 is calibrated with the determined resting position of the user, where content is on the display is neither expanded nor contracted. In yet example, the resting point is dynamically determined based on a position in which a user is currently operating computing device 102 (e.g., the position in which the user powers on the computer, logs in, a position in which the user manually sets a zoom value to zero or no magnification, etc.). In another example, lean angle determiner 210 determines that the user has shifted from a first resting point to a second resting point (e.g., due to the user repositioning themself), resulting in a new resting point to be identified. In this manner, a resting point for the user can be determined each time (or even a plurality of times) the user operates computing device 102.

In step 804, an application of the second zoom profile is altered based on the resting point. For instance, with reference to FIGS. 2 and 7, zoom controller 222 is configured to alter an application of user zoom profile 112 based on the determined resting point for the user. In some examples, the location of the resting point is used as an offset to one or more lean angle values 216 stored in user zoom profile 112, such that the lean angles are applied relative to the determined resting point (rather than a center line of display 408). As an illustration, if a user's normal resting point is left of center line 702 (e.g., at first user position 706A), second user position 706B is identified as a distance relative to this resting point. If a new resting point of the user is determined to be even further left of first position 706A, second user position 706B (and/or other positions shown and/or described herein) is adjusted further left based on the new resting point.

Thus, when the user exhibits movements to the left or right of the resting point, zoom controller 222 can cause content to be selectively zoomed based on the user positions relative to the determined resting point, resulting in a more accurate automated zooming. For instance, by taking into account a user's resting point (either in the generation of the user zoom profile or during a session in the user operates the computing device), automated zooming functions performed by zoom controller 222 can be performed more accurately (e.g., by preventing zoom unnecessary zoom actions from occurring if a user's normal position is off centered relative to the display). In addition, such techniques improve the ease of accessibility of the computing device, as the user can maintain their normal or resting posture while still viewing content that is selectively and/or automatically zoomed based on their movements. Thus, improvements to the GUI are also achieved in accordance with disclosed techniques.

Figure 9:
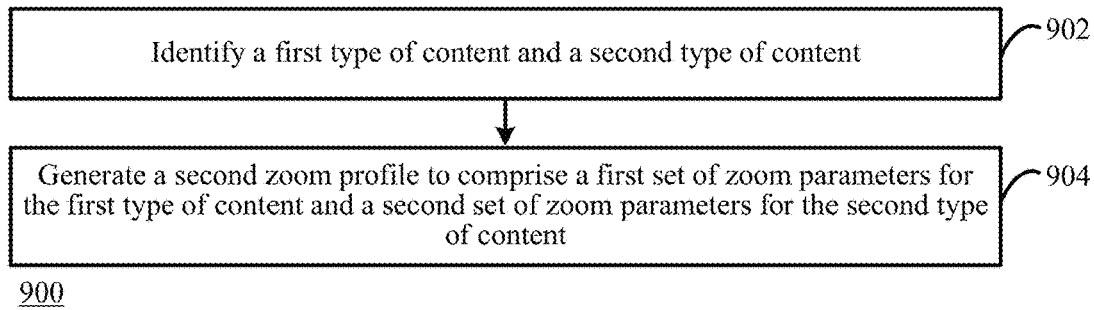
FIG. 9 shows a flowchart of a method for generating a zoom profile that contains content-specific parameters, in accordance with an example embodiment.

As discussed above, different zoom values are applied based on a type of rendered content in some embodiments. For example, FIG. 9 shows a flowchart 900 of a method for generating a zoom profile that contains content-specific parameters, in accordance with an example embodiment. In an embodiment, flowchart 900 is implemented by system 100 of FIG. 1 and/or system 200 of FIG. 2. Accordingly, flowchart 900 will be described with reference to FIGS. 1 and 2. Other structural and operational embodiments will be apparent to persons skilled in the relevant art(s) based on the following discussion regarding flowchart 900 and system 100 of FIG. 1, and system 200 of FIG. 2.

Flowchart 900 begins with step 902. In step 902, a first type of content and a second type of content are identified. For instance, with reference to FIG. 2, lean angle determiner 210 identifies a plurality of different types of content (e.g., videos, text editing, web browsing, etc.) that are rendered, or can be rendered, on display device 114. In examples, for each type of content, lean angle determiner 210 determines one or more user behaviors corresponding to the type of content, such as an amount of leaning (e.g., positions or movements) by the user when viewing such content and/or zoom actions performed (e.g., manually or automatically) during such leaning. In this manner, user behaviors as described herein are observed for different types of content, including a first type of content and a second type of content that is different from the first type.

In step 904, a second zoom profile is generated that comprises a first set of zoom parameters for the first type of content and a second set of zoom parameters for the second type of content. For instance, with reference to FIG. 2, zoom profile calibrator 214 stores content identifiers 220 in user zoom profile 112 corresponding to each of the first type of content and second type of content (and any additional types of content), along with a corresponding set of lean angle values and zoom values. In other words, user zoom profile 112 is generated in a manner such that a first set of zoom parameters (e.g., a first set of lean angle values 216 and a first set of zoom values 218) are stored for a first type of content, a second set of zoom parameters (e.g., a second set of lean angle values and a second set of zoom values) are stored for a second type of content, and so on. In this manner, user zoom profile 112 comprises a zoom profile that comprises content-specific values, such that zoom controller 222 is able to zoom content rendered on display device 114 based on both a detected user position and the type of content currently being rendered. In examples, the ability to learn and/or alter a zoom based on the type of content displayed has numerous advantages, including but not limited to, accurately zooming across different types of content as well as improving the overall GUI of the computing device.

Figure 10:
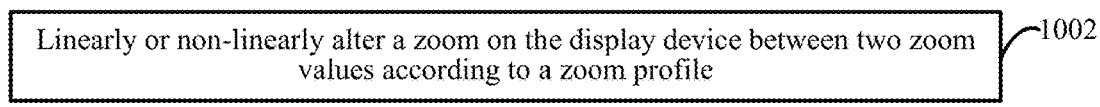
FIG. 10 shows a flowchart of a method for altering a zoom on a display between two zoom values, in accordance with an example embodiment.

As discussed above, different zoom values are applied within a range of lean angles specified in a zoom profile in some embodiments. For example, FIG. 10 shows a flowchart 1000 of a method for altering a zoom on a display between two zoom values, in accordance with an example embodiment. In an embodiment, flowchart 1000 is implemented by system 100 of FIG. 1, system 200 of FIG. 2, and/or system 700 of FIG. 7. Accordingly, flowchart 1000 will be described with reference to FIGS. 1, 2, and 7. Other structural and operational embodiments will be apparent to persons skilled in the relevant art(s) based on the following discussion regarding flowchart 1000 and system 100 of FIG. 1, system 200 of FIG. 2, and system 700 of FIG. 7.

Flowchart 1000 begins with step 1002. In step 1002, a zoom applied on a display device is linearly or non-linearly altered between two zoom values according to a zoom profile. For instance, with reference to FIG. 2, zoom controller 222 causes display controller 106 to alter a zoom applied to content on display device 114 based on a current position of a user according to user zoom profile 112. In various examples, such as the one described with reference to FIG. 7, a range of zoom values is specified between two (or more) positions of a user, such as a first zoom value (e.g., an initial zoom value) at a first user position and a second zoom value (e.g., a maximum zoom value) at a second user position. In such an example, user positions between the first and second user positions result in zoom controller 222 applying a zoom value between the first zoom value and the second zoom value.

In one implementation, zoom controller 222 is configured to apply a zoom value on content rendered on display 114 linearly depending on the current user position between the first and second user positions. For instance, if the current user position is halfway between the first and second user positions, the applied zoom value is halfway between the first zoom value and the second zoom value. In this manner, the zooming that zoom controller 222 applies is readily determined based on a linear calculation of the current user position, allowing user zoom profile 112 to store a small set of parameters (e.g., first and second user positions, and corresponding zoom values) in some examples.

In another example, user zoom profile 112 comprises a lookup table or other data structure which correlates each of a plurality of user positions to a corresponding zoom value (e.g., based on observed behaviors and/or based on pre-defined values), such that the zooming is performed non-linearly. For example, with continued reference to FIG. 7, additional user positions (e.g., between the first and second user positions, and/or other positions in which a user is able to operate the computing device) would be stored in user zoom profile 112 along with a corresponding zoom value. When zoom controller obtains information from lean angle determiner 210 regarding a current user position, zoom controller accesses user zoom profile 112 to determine the corresponding zoom angle to apply to display device 114. In this manner, the zoom applied by zoom controller 222 is able to be more granular and accurate.

In yet another example, zoom controller 222 is configured to apply user zoom profile 112 in combination with an area of a screen that the user is currently focused on to automated the degree of expansion on the screen, such as by automating the zoom to achieve a unified text level or size. For instance, the size of text rendered on display device 114 is expanded and/or contracted in an automated fashion to comprise the same level as perceived by a user based on different locations.

In yet another example, the zooming is performed based at least on the user moving to a position beyond a threshold position relative to the display device. For example, user zoom profile 112 specifies a particular zoom value (e.g., degree of expansion) to be performed when the user's position crosses a threshold (e.g., when the user's proximity to the display crosses a threshold proximity, or if the user moves to the left or right beyond a threshold). In such an example, a first constant zoom value is applied behind the threshold and a second constant zoom value is applied (and/or selectively zooming an area of the display) once the user passes the threshold.

In another variation, movements of the user in a different axis after crossing the threshold result in a further zooming change. For instance, in an example where a constant zoom value is applied by zoom controller 222 after the user passes a proximity threshold (e.g., moves closer to the display beyond a threshold position), a further movement in a direction to the right or left causes additional zooming actions to be performed (e.g., increasing the degree of magnification, selectively magnifying certain content on the display based on the user's horizontal position, etc.). In an illustration, a user's movement to a proximity 12" toward the display (e.g., without significant left or right movements) results in a 200% degree of expansion of content. If the user subsequently leans to the left or right after crossing the 12" threshold, additional zooming is performed in an various implementations, such as zooming on the left or right half of the screen. However, in such an example, left or right movements before crossing the 12" threshold would not result in zooming changes being performed. This example is only illustrative, and it should be understood that any combination of thresholds and user movements in one or more axes can be learned, used to generate user zoom profile 112, and/or applied by zoom controller 222 in implementations.

In various other examples, decreasing a degree of expansion is performed based on a few set of considerations, such as on a backward movement of the user relative to the display. In other words, while increasing a degree of expansion can be performed based on any combination of forward and/or left/right movements, decreasing a zoom level is performed based only on a backward movement in some implementations.

In various examples, zooming (linearly, non-linearly, based on a threshold, etc.) is accordingly performed based on any combination of considerations, including but not limited to, a type of content rendered, a range detected for the user, a user zoom profile (including any user settings specified therein), accessibility settings and/or considerations for a user, and/or a display size. In implementations, automated zoom system 110 receives user input 202 that specifies the manner in which zoom controller 222 operates (e.g., applying zooming linearly or non-linearly, based on a threshold, etc.)

Figure 11:
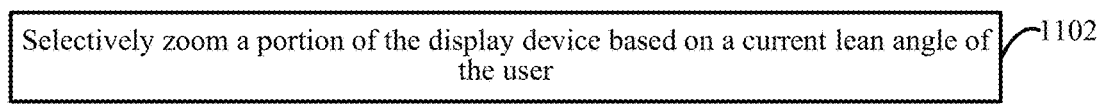
FIG. 11 shows a flowchart of a method for selectively zooming a portion of a display device, in accordance with an example embodiment.

As discussed above, different portions of a display device can be zoomed based on a user position in some embodiments. For example, FIG. 11 shows a flowchart 1100 of a method for selectively zooming a portion of a display device, in accordance with an example embodiment. In an embodiment, flowchart 1100 is implemented by system 100 of FIG. 1, system 200 of FIG. 2, and/or system 700 of FIG. 7. Accordingly, flowchart 1100 will be described with reference to FIGS. 1, 2, and 7. Other structural and operational embodiments will be apparent to persons skilled in the relevant art(s) based on the following discussion regarding flowchart 1100 and system 100 of FIG. 1, system 200 of FIG. 2, and system 700 of FIG. 7.

Flowchart 1100 begins with step 1102. In step 1102, a portion of a display device is selectively zoomed based on a current lean angle of a user. For instance, with reference to FIGS. 2 and 7, zoom controller 222 is configured to selectively zoom a portion of display device 114 based on information obtained from lean angle determiner 210 relating to a current lean angle (e.g., a position) of a user. In examples, the area of the display that is selectively zoomed comprises a section of the display, such as a quadrant, left quarter, left half, right quarter, right half, middle, or other predefined or dynamically determined section. In illustration, when the user is in second user position 706B, a section of the display that is left of the center line 702 but not all the way to the left most edge of the display is zoomed. If the user is at position 706C, a leftmost section of the display starting at the left most edge of the display is zoomed.

Selectively zooming based on a lean angle of a user allows for zooming only a particular portion of a screen (e.g., avoiding the need to zoom other portions of the screen). In this manner, graphics processing is utilized to render areas that are to be zoomed, while such processing is reduced or avoided for other areas of the screen for which a zooming action is not to be performed. In addition, such selective zooming (e.g., zooming the right half of the screen when a user leans to the right) allows for improved utilization of display devices, such as by allowing a user to view certain content that is zoomed in, while also viewing content in another portion of the screen that is not zoomed in. This allows the different portions of the display device to be utilized in different manners, depending on the detected lean angle of the user, thereby improving the usability and accessibility of display devices.

In another implementation, the area of the display that is selectively zoomed is based on the area of the display that the user attention is currently focused on or was most recently focused on. In yet another implementation, the area of the display that is selectively zoomed is based on the current or most recent location of a cursor (e.g., a mouse cursor, a typing cursor) or other user input. In another implementation, the area of the display that is selectively zoomed comprises a window, graphical element, application, etc. (e.g., on the side of the display in which the user is currently positioned) that is closest to the area that the user is currently or was previously focused on. In some implementations, the area of the screen that is closed to the area that the user is currently or was previously focused on that is zoom enabled is the area selected for automated zooming by zoom controller 222.

Figure 12:
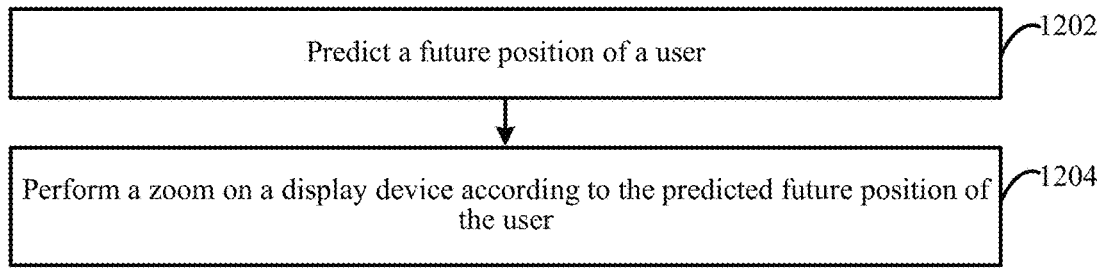
FIG. 12 shows a flowchart of a method for predicting a future position of a user, in accordance with an example embodiment.

In some implementations, zoom controller 222 automates a zoom on display device 114 based on an estimated user position. For example, FIG. 12 shows a flowchart 1200 of a method for predicting a future position of a user, in accordance with an example embodiment. In an embodiment, flowchart 1200 is implemented by system 100 of FIG. 1, system 200 of FIG. 2, and/or system 700 of FIG. 7. Accordingly, flowchart 1200 will be described with reference to FIGS. 1, 2, and 7. Other structural and operational embodiments will be apparent to persons skilled in the relevant art(s) based on the following discussion regarding flowchart 1200 and system 100 of FIG. 1, system 200 of FIG. 2, and system 700 of FIG. 7.

Flowchart 1200 begins with step 1202. In step 1202, a future position of a user is predicted. For instance, with reference to FIG. 2, lean angle determiner 210 is configured to identify, from information received from user sensor 108, information identifying a direction and/or velocity of a user of computing device 102 relative to display device 114. Based on the direction and/or velocity, lean angle determiner 210 predicts a future position of the user (e.g., an estimated position of the user in advance of the user actually moving to that position). In some implementations, lean angle determiner 210 predicts the future position of the user based on past learned user behaviors (e.g., based on statistics relating to positions that the user commonly operates computing device 102). In other examples, lean angle determiner 210 determines the future position dynamically (e.g., in real-time) as the user is moving to a new a position. In this manner, the position of the user can be predicted in advance of the user moving to a new position, allowing zooming to be performed with reduced latency. For instance, predicting the position of the user allows processing to be performed in advance of the user arriving at the predicted position, which can allow for content on the display device to be rendered around the time the user's arrival at the position (e.g., before or shortly thereafter), rather than waiting for the user's movements to cease before graphics processing begins.

In step 1204, a zoom is performed on a display device according to the predicted future position of the user. For instance, with reference to FIG. 2, zoom controller 222 is configured to apply the predicted future position of the user to user zoom profile 112 and determine a corresponding zoom value. Based on the corresponding zoom value associated with the predicted future position of the user, zoom controller 222 causes display controller 106 to zoom content rendered on display device 114 accordingly.

In some further examples, lean angle determiner 210 predicts an area of the screen (e.g., a user interface (UI) element, an application, etc.), such as the closest UI element that is zoom enabled. In such an example, zoom controller 222 is configured to apply user zoom profile 112 to zoom a corresponding area of the screen based on the prediction. In some other examples, a different degree of expansion is applied (e.g., a regular or normal zoom) to display 114, such as where the closest UI element has a distance relative to the user's predicted area of focus greater than a distance threshold. For instance, in such an example, a degree of expansion is applied to a larger portion of the screen (e.g., the left half, right half, center, etc.).

In accordance with a further example, lean angle determiner 210 continues to monitor the position of the user to determine if the final position of the user matches the predicted position. If the final position of the user does not match the predicted position, zoom controller 222 performs an additional zoom action to alter (e.g., correct) the degree of expansion on the display based on the final user position in some examples.

Figure 13:
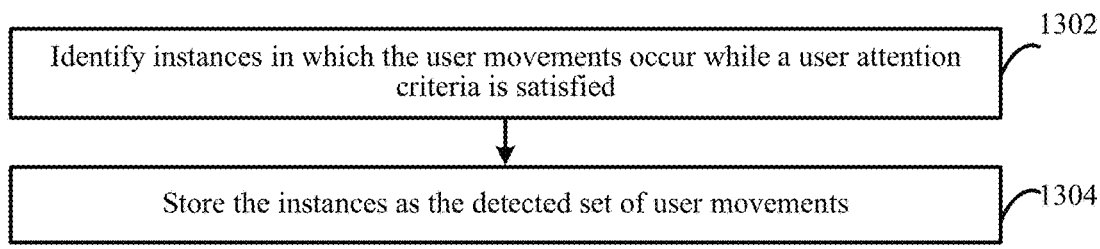
FIG. 13 shows a flowchart of a method for identifying user movements that occur while a user attention criteria is satisfied, in accordance with an example embodiment.

As described above, user zoom behaviors that satisfy an attention criteria are used to generate a personalized user zoom profile in various embodiments, which can enable various advantages as described in greater detail below (and elsewhere in this disclosure). For example, FIG. 13 shows a flowchart 1300 of a method for identifying user movements that occur while a user attention criteria is satisfied, in accordance with an example embodiment. In an embodiment, flowchart 1300 is implemented by system 100 of FIG. 1 and/or system 200 of FIG. 2. Accordingly, flowchart 1300 will be described with reference to FIGS. 1 and 2. Other structural and operational embodiments will be apparent to persons skilled in the relevant art(s) based on the following discussion regarding flowchart 1300 and system 100 of FIG. 1 and system 200 of FIG. 2.

Flowchart 1300 begins with step 1302. In step 1302, instances are identified in which user movements occur while a user attention criteria is satisfied. For instance, with reference to FIG. 2, attention detector 208 detects, among other things, whether a user attention criteria is satisfied. In examples, the user attention criteria is satisfied when attention detector 208 determines that the user of computing device 102 is focused on (e.g., looking at or towards) content rendered on display device 114. As noted above, attention detector 208 utilizes any one or more techniques to determine whether the attention criteria is satisfied, such as using eye tracking, head tracking, attention tracking, or other similar types of techniques.

In step 1304, the instances are stored as the detected set of user movements. For instance, with reference to FIG. 2, lean angle determiner 210 stores the detected set of user movements (and in some instances the corresponding zoom actions) for instances in which attention detector 208 determines that the attention criteria is satisfied. In other words, in various examples, lean angle determiner 210 is configured to store and/or utilize instances in which a user movement is observed while the user is focused on content rendered on display device 114.

Such filtering of information (e.g., by discarding observed user behaviors that occur when the user is not focused on the display) allows for a reduction in the amount of historical user behaviors that are stored. In addition, this filtering allows zoom profile calibrator 214 to generate user zoom profile 112 based on a filtered set of user movements, which results in reduced processing. Further, zoom profile calibrator 214 is able to generate a more accurate zoom profile, which allows for more accurate zooming, thereby conserving processing resources compared to other techniques as described above (e.g., where a trial and error approach is taken to zoom content, which results in additional graphics processing). Still further, such accurate zooming allows for an improvement to the GUI of computing device 102 by improving the ease of operability and accessibility of content rendered thereon. In addition, where a determination is made that a user attention criteria is not satisfied, certain processing (e.g., to detect user positions, predicting user positions, etc.) can be avoided in examples since such user movements would not result in zooming actions to be performed (e.g., due to the user's attention not being on the display device). In this manner, overall processing can be reduced by filtering out instances in which the user is not focused on the display device.

While examples are described in which lean angle determiner stores a set of historical user movements in which the attention criteria is satisfied, it should be understood that similar filtering also occurs during the automated zooming by zoom controller 222 (e.g., after user zoom profile 112 is generated). For instance, in some embodiments, lean angle determiner 210 is configured to provide information to zoom controller 222 based on user movements only where the attention criteria is satisfied, thereby avoiding unnecessary zoom actions from being performed.

III. Example Mobile Device and Computer System Implementation

Computing device 102, display controller 106, user sensor 108, automated zoom system 110, display device 114, behavior monitor 206, attention detector 208, lean angle determiner 208, zoom profile calibrator 214, zoom controller 222, and/or computing device 401 are implemented in hardware, or hardware combined with one or both of software and/or firmware. For example, display controller 106, automated zoom system 110, behavior monitor 206, attention detector 208, lean angle determiner 208, zoom profile calibrator 214, zoom controller 222, and/or the components described therein, and/or the steps of flowcharts 300, 600, 800, 900, 1000, 1100, 1200, and/or 1300 are each implemented as computer program code/instructions configured to be executed in one or more processors and stored in a computer readable storage medium. Alternatively, display controller 106, automated zoom system 110, behavior monitor 206, attention detector 208, lean angle determiner 208, zoom profile calibrator 214, zoom controller 222, and/or the components described therein, and/or the steps of flowcharts 300, 600, 800, 900, 1000, 1100, 1200, and/or 1300 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/ or further circuits, and optionally executes received program code and/or include embedded firmware to perform functions.

Figure 14:
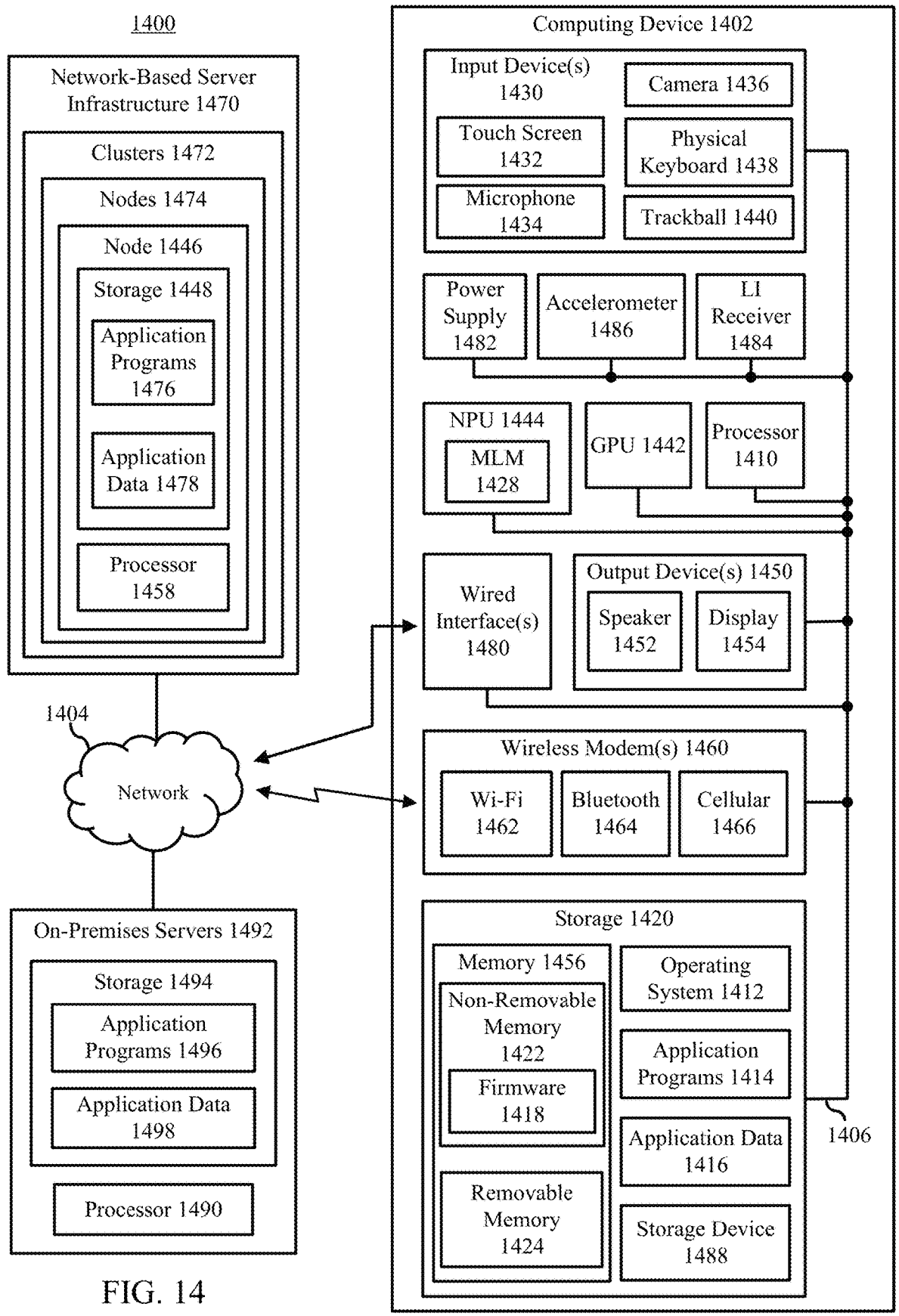
FIG. 14 shows a block diagram of an example computer system in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 14. FIG. 14 shows a block diagram of an exemplary computing environment 1400 that includes a computing device 1402. Computing device 1402 is an example of computing device 102 and computing device 401, which each include one or more of the components of computing device 1402. In some embodiments, computing device 1402 is communicatively coupled with devices (not shown in FIG. 14) external to computing environment 1400 via network 1404. Network 1404 comprises one or more networks such as local area networks (LANs), wide area networks (WANs), enterprise networks, the Internet, etc. In examples, network 1404 includes one or more wired and/or wireless portions. In some examples, network 1404 additionally or alternatively includes a cellular network for cellular communications. Computing device 1402 is described in detail as follows.

Computing device 1402 can be any of a variety of types of computing devices. Examples of computing device 1402 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 1402 is a stationary computing device such as a desktop computer, a personal computer (PC), a stationary server device, a minicomputer, a mainframe, a supercomputer, etc.

As shown in FIG. 14, computing device 1402 includes a variety of hardware and software components, including a processor 1410, a storage 1420, a graphics processing unit (GPU) 1442, a neural processing unit (NPU) 1444, one or more input devices 1430, one or more output devices 1450, one or more wireless modems 1460, one or more wired interfaces 1480, a power supply 1482, a location information (LI) receiver 1484, and an accelerometer 1486. Storage 1420 includes memory 1456, which includes non-removable memory 1422 and removable memory 1424, and a storage device 1488. Storage 1420 also stores an operating system 1412, application programs 1414, and application data 1416. Wireless modem(s) 1460 include a Wi-Fi modem 1462, a Bluetooth modem 1464, and a cellular modem 1466. Output device(s) 1450 includes a speaker 1452 and a display 1454. Input device(s) 1430 includes a touch screen 1432, a microphone 1434, a camera 1436, a physical keyboard 1438, and a trackball 1440. Not all components of computing device 1402 shown in FIG. 14 are present in all embodiments, additional components not shown may be present, and in a particular embodiment any combination of the components are present. In examples, components of computing device 1402 are mounted to a circuit card (e.g., a motherboard) of computing device 1402, integrated in a housing of computing device 1402, or otherwise included in computing device 1402. The components of computing device 1402 are described as follows.

In embodiments, a single processor 1410 (e.g., central processing unit (CPU), microcontroller, a microprocessor, signal processor, ASIC (application specific integrated circuit), and/or other physical hardware processor circuit) or multiple processors 1410 are present in computing device 1402 for performing such tasks as program execution, signal coding, data processing, input/output processing, power control, and/or other functions. In examples, processor 1410 is a single-core or multi-core processor, and each processor core is single-threaded or multithreaded (to provide multiple threads of execution concurrently). Processor 1410 is configured to execute program code stored in a computer readable medium, such as program code of operating system 1412 and application programs 1414 stored in storage 1420. The program code is structured to cause processor 1410 to perform operations, including the processes/methods disclosed herein. Operating system 1412 controls the allocation and usage of the components of computing device 1402 and provides support for one or more application programs 1414 (also referred to as "applications" or "apps"). In examples, application programs 1414 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 1410 includes one or more general processors (e.g., CPUs) configured with or coupled to one or more hardware accelerators, such as one or more NPUs 1444 and/or one or more GPUs 1442.

Any component in computing device 1402 can communicate with any other component according to function, although not all connections are shown for ease of illustration. For instance, as shown in FIG. 14, bus 1406 is a multiple signal line communication medium (e.g., conductive traces in silicon, metal traces along a motherboard, wires, etc.) present to communicatively couple processor 1410 to various other components of computing device 1402, although in other embodiments, an alternative bus, further buses, and/or one or more individual signal lines is/are present to communicatively couple components. Bus 1406 represents one or more of any of several types of bus structures, including a memory bus or memory controller, a peripheral bus, an accelerated graphics port, and a processor or local bus using any of a variety of bus architectures.

Storage 1420 is physical storage that includes one or both of memory 1456 and storage device 1488, which store operating system 1412, application programs 1414, and application data 1416 according to any distribution. Non-removable memory 1422 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 1422 includes main memory and is separate from or fabricated in a same integrated circuit as processor 1410. As shown in FIG. 14, non-removable memory 1422 stores firmware 1418 that is present to provide low-level control of hardware. Examples of firmware 1418 include BIOS (Basic Input/Output System, such as on personal computers) and boot firmware (e.g., on smart phones). In examples, removable memory 1424 is inserted into a receptacle of or is otherwise coupled to computing device 1402 and can be removed by a user from computing device 1402. Removable memory 1424 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 1488 are present that are internal and/or external to a housing of computing device 1402 and are or are not removable. Examples of storage device 1488 include a hard disk drive, a SSD, a thumb drive (e.g., a USB (Universal Serial Bus) flash drive), or other physical storage device.

One or more programs are stored in storage 1420. Such programs include operating system 1412, one or more application programs 1414, and other program modules and program data. Examples of such application programs include computer program logic (e.g., computer program code/instructions) for implementing display controller 106, automated zoom system 110, behavior monitor 206, attention detector 208, lean angle determiner 208, zoom profile calibrator 214, zoom controller 222, and/or each of the components described therein, as well as any of flowcharts 300, 600, 800, 900, 1000, 1100, 1200, and/or 1300, and/or any individual steps thereof.

Storage 1420 also stores data used and/or generated by operating system 1412 and application programs 1414 as application data 1416. Examples of application data 1416 include web pages, text, images, tables, sound files, video data, and other data. In examples, application data 1416 is sent to and/or received from one or more network servers or other devices via one or more wired or wireless networks. Storage 1420 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 1402 through one or more input devices 1430 and receives information from computing device 1402 through one or more output devices 1450. Input device(s) 1430 includes one or more of touch screen 1432, microphone 1434, camera 1436, physical keyboard 1438 and/or trackball 1440 and output device(s) 1450 includes one or more of speaker 1452 and display 1454. Each of input device(s) 1430 and output device(s) 1450 are integral to computing device 1402 (e.g., built into a housing of computing device 1402) or are external to computing device 1402 (e.g., communicatively coupled wired or wirelessly to computing device 1402 via wired interface(s) 1480 and/or wireless modem(s) 1460). Further input devices 1430 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1454 displays information, as well as operating as touch screen 1432 by receiving user commands and/or other information (e.g., by touch, finger gestures, virtual keyboard, etc.) as a user interface. Any number of each type of input device(s) 1430 and output device(s) 1450 are present, including multiple microphones 1434, multiple cameras 1436, multiple speakers 1452, and/or multiple displays 1454.

In embodiments where GPU 1442 is present, GPU 1442 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 1442 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 1444 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 1428. In an example, NPU 1444 is configured for a data-driven parallel computing and is highly efficient at processing massive multimedia data such as videos and images and processing data for neural networks. NPU 1444 is configured for efficient handling of AI-related tasks, such as speech recognition, background blurring in video calls, photo or video editing processes like object detection, etc.

In embodiments disclosed herein that implement ML models, NPU 1444 can be utilized to execute such ML models, of which MLM 1428 is an example. For instance, where applicable, MLM 1428 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 1444 is used to train MLM 1428. To train MLM 1428, training data is that includes input features (attributes) and their corresponding output labels/target values (e.g., for supervised learning) is collected. A training algorithm is a computational procedure that is used so that MLM 1428 learns from the training data. Parameters/weights are internal settings of MLM 1428 that are adjusted during training by the training algorithm to reduce a difference between predictions by MLM 1428 and actual outcomes (e.g., output labels). In some examples, MLM 1428 is set with initial values for the parameters/weights. A loss function measures a dissimilarity between predictions by MLM 1428 and the target values, and the parameters/weights of MLM 1428 are adjusted to minimize the loss function. The parameters/weights are iteratively adjusted by an optimization technique, such as gradient descent. In this manner, MLM 1428 is generated through training by NPU 1444 to be used to generate inferences based on received input feature sets for particular applications. MLM 1428 is generated as a computer program or other type of algorithm configured to generate an output (e.g., a classification, a prediction/inference) based on received input features, and is stored in the form of a file or other data structure.

In examples, such training of MLM 1428 by NPU 1444 is supervised or unsupervised. According to supervised learning, input objects (e.g., a vector of predictor variables) and a desired output value (e.g., a human-labeled supervisory signal) train MLM 1428. The training data is processed, building a function that maps new data on expected output values. Example algorithms usable by NPU 1444 to perform supervised training of MLM 1428 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 1428 is an LLM, MLM 1428 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 1428 is trained to learn patterns from unlabeled data. For instance, in embodiments where MLM 1428 implements unsupervised learning techniques, MLM 1428 identifies one or more classifications or clusters to which an input belongs. During a training phase of MLM 1428 according to unsupervised learning, MLM 1428 tries to mimic the provided training data and uses the error in its mimicked output to correct itself (i.e., correct weights and biases). In further examples, NPU 1444 perform unsupervised training of MLM 1428 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 1444 need not necessarily be present in all ML model embodiments. In embodiments where ML models are present, any one or more of processor 1410, GPU 1442, and/or NPU 1444 can be present to train and/or execute MLM 1428.

One or more wireless modems 1460 can be coupled to antenna(s) (not shown) of computing device 1402 and can support two-way communications between processor 1410 and devices external to computing device 1402 through network 1404, as would be understood to persons skilled in the relevant art(s). Wireless modem 1460 is shown generically and can include a cellular modem 1466 for communicating with one or more cellular networks, such as a GSM network for data and voice communications within a single cellular network, between cellular networks, or between the mobile device and a public switched telephone network (PSTN). In examples, wireless modem 1460 also or alternatively includes other radio-based modem types, such as a Bluetooth modem 1464 (also referred to as a "Bluetooth device") and/or Wi-Fi modem 1462 (also referred to as an "wireless adaptor"). Wi-Fi modem 1462 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1464 is configured to communicate with another Bluetooth-capable device according to the Bluetooth short-range wireless technology standard(s) such as IEEE 802.15.1 and/or managed by the Bluetooth Special Interest Group (SIG).

Computing device 1402 can further include power supply 1482, LI receiver 1484, accelerometer 1486, and/or one or more wired interfaces 1480. Example wired interfaces 1480 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1480 of computing device 1402 provide for wired connections between computing device 1402 and network 1404, or between computing device 1402 and one or more devices/peripherals when such devices/peripherals are external to computing device 1402 (e.g., a pointing device, display 1454, speaker 1452, camera 1436, physical keyboard 1438, etc.). Power supply 1482 is configured to supply power to each of the components of computing device 1402 and receives power from a battery internal to computing device 1402, and/or from a power cord plugged into a power port of computing device 1402 (e.g., a USB port, an A/C power port). LI receiver 1484 is useable for location determination of computing device 1402 and in examples includes a satellite navigation receiver such as a Global Positioning System (GPS) receiver and/or includes other type of location determiner configured to determine location of computing device 1402 based on received information (e.g., using cell tower triangulation, etc.). Accelerometer 1486, when present, is configured to determine an orientation of computing device 1402.

Note that the illustrated components of computing device 1402 are not required or all-inclusive, and fewer or greater numbers of components can be present as would be recognized by one skilled in the art. In examples, computing device 1402 includes one or more of a gyroscope, barometer, proximity sensor, ambient light sensor, digital compass, etc. In an example, processor 1410 and memory 1456 are co-located in a same semiconductor device package, such as being included together in an integrated circuit chip, FPGA, or system-on-chip (SOC), optionally along with further components of computing device 1402.

In embodiments, computing device 1402 is configured to implement any of the above-described features of flowcharts herein. Computer program logic for performing any of the operations, steps, and/or functions described herein is stored in storage 1420 and executed by processor 1410.

In some embodiments, server infrastructure 1470 is present in computing environment 1400 and is communicatively coupled with computing device 1402 via network 1404. Server infrastructure 1470, when present, is a network-accessible server set (e.g., a cloud-based environment or platform). As shown in FIG. 14, server infrastructure 1470 includes clusters 1472. Each of clusters 1472 comprises a group of one or more compute nodes and/or a group of one or more storage nodes. For example, as shown in FIG. 14, cluster 1472 includes nodes 1474. Each of nodes 1474 are accessible via network 1404 (e.g., in a "cloud-based" embodiment) to build, deploy, and manage applications and services. In examples, any of nodes 1474 is a storage node that comprises a plurality of physical storage disks, SSDs, and/or other physical storage devices that are accessible via network 1404 and are configured to store data associated with the applications and services managed by nodes 1474.

Each of nodes 1474, as a compute node, comprises one or more server computers, server systems, and/or computing devices. For instance, a node 1474 in accordance with an embodiment includes one or more of the components of computing device 1402 disclosed herein. Each of nodes 1474 is configured to execute one or more software applications (or "applications") and/or services and/or manage hardware resources (e.g., processors, memory, etc.), which are utilized by users (e.g., customers) of the network-accessible server set. In examples, as shown in FIG. 14, nodes 1474 includes a node 1446 that includes storage 1448 and/or one or more of a processor 1458 (e.g., similar to processor 1410, GPU 1442, and/or NPU 1444 of computing device 1402). Storage 1448 stores application programs 1476 and application data 1478. Processor(s) 1458 operate application programs 1476 which access and/or generate related application data 1478. In an implementation, nodes such as node 1446 of nodes 1474 operate or comprise one or more virtual machines, with each virtual machine emulating a system architecture (e.g., an operating system), in an isolated manner, upon which applications such as application programs 1476 are executed.

In embodiments, one or more of clusters 1472 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 1472 are included in a datacenter in a distributed collection of datacenters. In embodiments, exemplary computing environment 1400 comprises part of a cloud-based platform.

In an embodiment, computing device 1402 accesses application programs 1476 for execution in any manner, such as by a client application and/or a browser at computing device 1402.

In an example, for purposes of network (e.g., cloud) backup and data security, computing device 1402 additionally and/or alternatively synchronizes copies of application programs 1414 and/or application data 1416 to be stored at network-based server infrastructure 1470 as application programs 1476 and/or application data 1478. In examples, operating system 1412 and/or application programs 1414 include a file hosting service client configured to synchronize applications and/or data stored in storage 1420 at network-based server infrastructure 1470.

In some embodiments, on-premises servers 1492 are present in computing environment 1400 and are communicatively coupled with computing device 1402 via network 1404. On-premises servers 1492, when present, are hosted within an organization's infrastructure and, in many cases, physically onsite of a facility of that organization. On-premises servers 1492 are controlled, administered, and maintained by IT (Information Technology) personnel of the organization or an IT partner to the organization. Application data 1498 can be shared by on-premises servers 1492 between computing devices of the organization, including computing device 1402 (when part of an organization) through a local network of the organization, and/or through further networks accessible to the organization (including the Internet). Furthermore, in examples, on-premises servers 1492 serve applications such as application programs 1496 to the computing devices of the organization, including computing device 1402. Accordingly, in examples, on-premises servers 1492 include storage 1494 (which includes one or more physical storage devices such as storage disks and/or SSDs) for storage of application programs 1496 and application data 1498 and include a processor 1490 (e.g., similar to processor 1410, GPU 1442, and/or NPU 1444 of computing device 1402) for execution of application programs 1496. In some embodiments, multiple processors 1490 are present for execution of application programs 1496 and/or for other purposes. In further examples, computing device 1402 is configured to synchronize copies of application programs 1414 and/or application data 1416 for backup storage at on-premises servers 1492 as application programs 1496 and/or application data 1498.

Embodiments described herein may be implemented in one or more of computing device 1402, network-based server infrastructure 1470, and on-premises servers 1492. For example, in some embodiments, computing device 1402 is used to implement systems, clients, or devices, or components/subcomponents thereof, disclosed elsewhere herein. In other embodiments, a combination of computing device 1402, network-based server infrastructure 1470, and/or on-premises servers 1492 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1420. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1414) are stored in storage 1420. Such computer programs can also be received via wired interface(s) 1460 and/or wireless modem(s) 1460 over network 1404. Such computer programs, when executed or loaded by an application, enable computing device 1402 to implement features of embodiments discussed herein. Accordingly, such computer programs represent controllers of the computing device 1402.

Embodiments are also directed to computer program products comprising computer code or instructions stored on any computer-readable medium or computer-readable storage medium. Such computer program products include the physical storage of storage 1420 as well as further physical storage types.

IV. Additional Example Embodiments

A system for adjusting a display zoom setting is disclosed herein. The system includes a processor; and a memory device a memory device that stores program code structured to cause the processor to: display first content on a display device according to a first zoom profile, the first zoom profile identifying a first zoom value for a first lean angle and a second zoom value for a second lean angle, the first lean angle and the second lean angle based on a position of a user in a first direction parallel to a display device; observe zoom behaviors of the user over a period of time, the zoom behaviors based on a detected set of user movements; calibrate the first zoom profile based on the observed zoom behaviors to generate a second zoom profile; and display second content on the display device according to the second zoom profile.

In one implementation of the foregoing system, the detected set of user movements comprise a first movement of the user in the first direction parallel to the display device and a second movement of the user in a second direction perpendicular to the display device.

In another implementation of the foregoing system, the detected set of user movements is captured by a camera mounted on the display device.

In another implementation of the foregoing system, the second zoom profile identifies a third zoom value for a third lean angle and a fourth zoom value for a fourth lean angle based on the detected set of user movements.

In another implementation of the foregoing system, the program code is further structured to cause the processor to: determine a resting point for the user; and alter an application of the second zoom profile based on the resting point.

In another implementation of the foregoing system, the program code is structured to cause the processor to calibrate the first zoom profile to generate the second zoom profile by: identifying a first type of content and a second type of content; and generating the second zoom profile to comprise a first set of zoom parameters for the first type of content and a second set of zoom parameters for the second type of content.

In another implementation of the foregoing system, the program code is structured to cause the processor to display the second content on the display device according to the second zoom profile by: linearly altering a zoom on the display device between the third zoom value and the fourth zoom value.

In another implementation of the foregoing system, the program code is structured to cause the processor to display the second content on the display device according to the second zoom profile by: non-linearly altering a zoom on the display device between the third zoom value and the fourth zoom value.

In another implementation of the foregoing system, the program code is structured to cause the processor to display the second content on the display device by: selectively zooming a portion of the display device based on a current lean angle of the user.

In another implementation of the foregoing system, the program code is structured to cause the processor to display the second content on the display device by: predicting a future position of the user; and performing a zoom on the display device according to the predicted future position of the user.

In another implementation of the foregoing system, the program code is structured to cause the processor to observe the zoom behaviors of the user by: identifying instances in which the user movements occur while a user attention criteria is satisfied; and storing the instances as the detected set of user movements.

A method for adjusting a display zoom setting is disclosed herein. The method includes: displaying first content on a display device according to a first zoom profile, the first zoom profile identifying a first zoom value for a first lean angle and a second zoom value for a second lean angle, the first lean angle and the second lean angle based on a position of a user in a first direction parallel to a display device; observing zoom behaviors of the user over a period of time, the zoom behaviors based on a detected set of user movements; calibrating the first zoom profile based on the observed zoom behaviors to generate a second zoom profile; and displaying second content on the display device according to the second zoom profile.

In one implementation of the foregoing method, the method further comprises: determining a resting point for the user; and altering an application of the second zoom profile based on the resting point.

In another implementation of the foregoing method, the method further comprises: identifying a first type of content and a second type of content; and generating the second zoom profile to comprise a first set of zoom parameters for the first type of content and a second set of zoom parameters for the second type of content.

In another implementation of the foregoing method, the method further comprises: selectively zooming a portion of the display device based on a current lean angle of the user.

In another implementation of the foregoing method, the method further comprises: predicting a future position of the user; and performing a zoom on the display device according to the predicted future position of the user.

In another implementation of the foregoing method, the method further comprises: identifying instances in which the user movements occur while a user attention criteria is satisfied; and storing the instances as the detected set of user movements.

A computer-readable storage medium is disclosed herein. The computer-readable storage medium has computer program code recorded thereon that when executed by at least one processor causes the at least one processor to perform a method comprising: displaying first content on a display device according to a first zoom profile, the first zoom profile identifying a first zoom value for a first lean angle and a second zoom value for a second lean angle, the first lean angle and the second lean angle based on a position of a user in a first direction parallel to a display device; observing zoom behaviors of the user over a period of time, the zoom behaviors based on a detected set of user movements; calibrating the first zoom profile based on the observed zoom behaviors to generate a second zoom profile; and displaying second content on the display device according to the second zoom profile.

In one implementation of the foregoing computer-readable storage medium, the method further comprises: identifying a first type of content and a second type of content; and generating the second zoom profile to comprise a first set of zoom parameters for the first type of content and a second set of zoom parameters for the second type of content.

In another implementation of the foregoing computer-readable storage medium, the method further comprises: predicting a future position of the user; and performing a zoom on the display device according to the predicted future position of the user.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" and/or "in response to" are used to indicate an effect being a result of an indicated cause, it is to be understood that the effect is not required to only result from the indicated cause, but that any number of possible additional causes may also contribute to the effect. Thus, as used herein, the terms "based on" and "in response to" should be understood to be equivalent to the term "based at least on" and "at least in response to," respectively.

While various embodiments of the present disclosure have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the claimed embodiments should not be limited by any of the above-described exemplary embodiments, but should be defined only in accordance with the following claims and their equivalents.

What is claimed is:

1. A system for adjusting a display zoom setting, the system comprising:
    a processor; and
    a memory device that stores program code structured to cause the processor to:
        display first content on a display device according to a first zoom profile, the first zoom profile identifying a first zoom value for a first lean angle and a second zoom value for a second lean angle, the first lean angle and the second lean angle based on a position of a user in a first direction parallel to a display device;
        observe zoom behaviors of the user over a period of time, the zoom behaviors based on a detected set of user movements;
        calibrate the first zoom profile based on the observed zoom behaviors to generate a second zoom profile; and
        display second content on the display device according to the second zoom profile.

2. The system of claim 1, wherein the detected set of user movements comprise a first movement of the user in the first direction parallel to the display device and a second movement of the user in a second direction perpendicular to the display device.

3. The system of claim 1, wherein the detected set of user movements is captured by a camera mounted on the display device.

4. The system of claim 1, wherein the second zoom profile identifies a third zoom value for a third lean angle and a fourth zoom value for a fourth lean angle based on the detected set of user movements.

5. The system of claim 4, wherein the program code is structured to cause the processor to display the second content on the display device according to the second zoom profile by:
    linearly altering a zoom on the display device between the third zoom value and the fourth zoom value.

6. The system of claim 4, wherein the program code is structured to cause the processor to display the second content on the display device according to the second zoom profile by:
    non-linearly altering a zoom on the display device between the third zoom value and the fourth zoom value.

7. The system of claim 1, wherein the program code is further structured to cause the processor to:
    determine a resting point for the user; and
    alter an application of the second zoom profile based on the resting point.

8. The system of claim 1, wherein the program code is structured to cause the processor to calibrate the first zoom profile to generate the second zoom profile by:
    identifying a first type of content and a second type of content; and
    generating the second zoom profile to comprise a first set of zoom parameters for the first type of content and a second set of zoom parameters for the second type of content.

9. The system of claim 1, wherein the program code is structured to cause the processor to display the second content on the display device by:
    selectively zooming a portion of the display device based on a current lean angle of the user.

10. The system of claim 1, wherein the program code is structured to cause the processor to display the second content on the display device by:
predicting a future position of the user; and
performing a zoom on the display device according to the predicted future position of the user.

11. The system of claim 1, wherein the program code is structured to cause the processor to observe the zoom behaviors of the user by:
identifying instances in which the user movements occur while a user attention criteria is satisfied; and
storing the instances as the detected set of user movements.

12. A method for adjusting a display zoom setting, the method comprising:
displaying first content on a display device according to a first zoom profile, the first zoom profile identifying a first zoom value for a first lean angle and a second zoom value for a second lean angle, the first lean angle and the second lean angle based on a position of a user in a first direction parallel to a display device;
observing zoom behaviors of the user over a period of time, the zoom behaviors based on a detected set of user movements;
calibrating the first zoom profile based on the observed zoom behaviors to generate a second zoom profile; and
displaying second content on the display device according to the second zoom profile.

13. The method of claim 12, further comprising:
determining a resting point for the user; and
altering an application of the second zoom profile based on the resting point.

14. The method of claim 12, further comprising:
identifying a first type of content and a second type of content; and
generating the second zoom profile to comprise a first set of zoom parameters for the first type of content and a second set of zoom parameters for the second type of content.

15. The method of claim 12, further comprising:
selectively zooming a portion of the display device based on a current lean angle of the user.

16. The method of claim 12, further comprising:
predicting a future position of the user; and
performing a zoom on the display device according to the predicted future position of the user.

17. The method of claim 12, further comprising:
identifying instances in which the user movements occur while a user attention criteria is satisfied; and
storing the instances as the detected set of user movements.

18. A computer-readable storage medium having computer program code recorded thereon that when executed by at least one processor causes the at least one processor to perform a method comprising:
displaying first content on a display device according to a first zoom profile, the first zoom profile identifying a first zoom value for a first lean angle and a second zoom value for a second lean angle, the first lean angle and the second lean angle based on a position of a user in a first direction parallel to a display device;
observing zoom behaviors of the user over a period of time, the zoom behaviors based on a detected set of user movements;
calibrating the first zoom profile based on the observed zoom behaviors to generate a second zoom profile; and
displaying second content on the display device according to the second zoom profile.

19. The computer-readable storage medium of claim 18, wherein the method further comprises:
identifying a first type of content and a second type of content; and
generating the second zoom profile to comprise a first set of zoom parameters for the first type of content and a second set of zoom parameters for the second type of content.

20. The computer-readable storage medium of claim 18, wherein the method further comprises:
predicting a future position of the user; and
performing a zoom on the display device according to the predicted future position of the user.

\* \* \* \* \*